(12) United States Patent
Koshiyama et al.

(10) Patent No.: US 9,915,306 B2
(45) Date of Patent: Mar. 13, 2018

(54) ROTOR COVER AND BICYCLE WHEEL ASSEMBLY

(71) Applicant: SHIMANO INC., Sakai (JP)

(72) Inventors: Kazuki Koshiyama, Sakai (JP); Takafumi Nishino, Sakai (JP); Shingo Sakurai, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 261 days.

(21) Appl. No.: 14/583,064

(22) Filed: Dec. 24, 2014

(65) Prior Publication Data
US 2016/0186822 A1 Jun. 30, 2016

(51) Int. Cl.
| | |
|---|---|
| *F16D 65/00* | (2006.01) |
| *B60B 27/00* | (2006.01) |
| *B60B 27/02* | (2006.01) |
| *B62J 23/00* | (2006.01) |
| *B62K 25/02* | (2006.01) |
| *B62L 1/00* | (2006.01) |
| *F16D 55/00* | (2006.01) |

(52) U.S. Cl.
CPC ...... *F16D 65/0081* (2013.01); *B60B 27/0052* (2013.01); *B60B 27/023* (2013.01); *B62J 23/00* (2013.01); *B62K 25/02* (2013.01); *B60B 27/026* (2013.01); *B62L 1/00* (2013.01); *B62L 1/005* (2013.01); *F16D 2055/0037* (2013.01)

(58) Field of Classification Search
CPC ...... F16D 65/0081; F16D 65/80; F16D 65/82; F16D 65/827; F16D 65/807; F16D 65/84; F16D 65/847; F16D 2055/0037; B60B 27/0052; B60B 27/023; B60B 27/026; B62L 1/005; B62L 1/00; B62J 23/00; B62K 25/02

USPC .................. 301/6.3, 6.9, 37.1, 6.8, 124.2
See application file for complete search history.

(56) References Cited

U.S. PATENT DOCUMENTS

| | | | | |
|---|---|---|---|---|
| 4,226,308 A | * | 10/1980 | Nishiyama | F16D 55/22 188/218 A |
| 4,326,610 A | * | 4/1982 | Mouza | F16D 53/00 188/218 A |
| 4,473,139 A | * | 9/1984 | Oka | F16D 55/22 188/218 A |
| 4,744,606 A | * | 5/1988 | Yoshida | B60B 7/14 188/264 AA |
| 6,155,369 A | * | 12/2000 | Whittaker | B62M 6/90 180/206.5 |

(Continued)

FOREIGN PATENT DOCUMENTS

| | | |
|---|---|---|
| DE | 20 2013 011 069 U1 | 1/2014 |
| DE | 10 2014 101 207 | 8/2015 |

(Continued)

*Primary Examiner* — Jason R Bellinger
*Assistant Examiner* — Scott A Browne
(74) *Attorney, Agent, or Firm* — Mori & Ward, LLP

(57) ABSTRACT

A rotor cover comprises a cover body and a biasing member. The cover body is configured to at least partially cover a disc brake rotor rotatable relative to a bicycle frame about a rotational center axis. The biasing member is configured to bias the cover body in an axial direction parallel to the rotational center axis. The biasing member is provided between the cover body and the bicycle frame in the axial direction.

9 Claims, 22 Drawing Sheets

(56) References Cited

U.S. PATENT DOCUMENTS

| | | | | |
|---|---|---|---|---|
| 6,155,650 A * | 12/2000 | Barger | | F16D 65/847 |
| | | | | 188/218 A |
| 6,260,931 B1 * | 7/2001 | Stewart | | B60B 27/0078 |
| | | | | 301/110.5 |
| 6,336,531 B1 * | 1/2002 | Chou | | F16D 65/12 |
| | | | | 188/18 A |
| 6,371,569 B1 * | 4/2002 | Dean | | B60B 7/061 |
| | | | | 188/218 A |
| 6,796,406 B1 * | 9/2004 | Yunes | | F16D 55/02 |
| | | | | 188/218 A |
| 6,837,341 B2 * | 1/2005 | Matsueda | | B62L 1/005 |
| | | | | 188/24.22 |
| 6,964,323 B2 * | 11/2005 | Campbell | | B62L 1/005 |
| | | | | 188/18 A |
| 7,337,884 B2 * | 3/2008 | Paulik | | F16D 65/847 |
| | | | | 188/264 A |
| 7,854,302 B2 * | 12/2010 | Fukui | | B62L 1/005 |
| | | | | 188/26 |
| 8,172,050 B2 * | 5/2012 | Mikura | | B62J 23/00 |
| | | | | 188/218 A |
| 8,573,878 B2 * | 11/2013 | Chang | | B62K 25/02 |
| | | | | 301/124.2 |
| 9,422,993 B2 * | 8/2016 | Watarai | | F16D 65/12 |
| 9,561,833 B2 * | 2/2017 | Schlanger | | B62K 25/02 |
| 2005/0250414 A1 * | 11/2005 | Leonov | | A63H 17/22 |
| | | | | 446/454 |
| 2009/0266655 A1 * | 10/2009 | Mikura | | B62J 23/00 |
| | | | | 188/218 A |
| 2016/0025164 A1 | 1/2016 | Watarai et al. | | |

FOREIGN PATENT DOCUMENTS

| | | | | |
|---|---|---|---|---|
| DE | 10 2015 009 628 | | 1/2016 | |
| JP | S 6067245 A | * | 4/1985 | ............ F16D 65/12 |
| JP | 04244491 A | * | 9/1992 | ............ F16D 65/12 |

\* cited by examiner

ROTOR COVER AND BICYCLE WHEEL ASSEMBLY

BACKGROUND OF THE INVENTION

Field of the Invention

The present invention relates to a rotor cover and a bicycle wheel assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a disc brake system. A disc brake system includes a disc brake rotor, a disc brake caliper, and a brake operating device. The disc brake rotor is rotatably supported by a bicycle hub assembly of a wheel.

SUMMARY OF THE INVENTION

In accordance with a first aspect of the present invention, a rotor cover comprises a cover body and a biasing member. The cover body is configured to at least partially cover a disc brake rotor rotatable relative to a bicycle frame about a rotational center axis. The biasing member is configured to bias the cover body in an axial direction parallel to the rotational center axis. The biasing member is provided between the cover body and the bicycle frame in the axial direction.

In accordance with a second aspect of the present invention, the rotor cover according to the first aspect is configured so that the cover body and the biasing member are configured to be mounted to a bicycle hub assembly configured to rotatably support the disc brake rotor relative to the bicycle frame.

In accordance with a third aspect of the present invention, the rotor cover according to the first aspect is configured so that the biasing member comprises a coil spring configured to be compressed between the cover body and the bicycle frame in the axial direction.

In accordance with a fourth aspect of the present invention, the rotor cover according to the third aspect further comprises a spacer configured to be provided between the cover body and the bicycle frame in the axial direction. The spacer is configured to be mounted to a bicycle hub assembly. The spacer including a cavity.

In accordance with a fifth aspect of the present invention, the rotor cover according to the fourth aspect is configured so that the biasing member is provided in the cavity of the spacer.

In accordance with a sixth aspect of the present invention, the rotor cover according to the fourth aspect is configured so that the spacer is a separate member from the cover body.

In accordance with a seventh aspect of the present invention, the rotor cover according to the fourth aspect is configured so that the spacer is integrally provided with the cover body as a single unitary member.

In accordance with an eighth aspect of the present invention, the rotor cover according to the fourth aspect is configured so that the cavity comprises a through-hole extending in the axial direction.

In accordance with a ninth aspect of the present invention, the rotor cover according to the first aspect is configured so that the biasing member comprises a spring washer configured to be compressed between the cover body and the bicycle frame in the axial direction.

In accordance with a tenth aspect of the present invention, a rotor cover comprises a cover body configured to at least partially cover a disc brake rotor rotatable relative to a bicycle frame about a rotational center axis. The cover body includes a mounting portion configured to be mounted to a brake caliper assembly configured to apply a braking force to the disc brake rotor.

In accordance with an eleventh aspect of the present invention, the rotor cover according to the tenth aspect is configured so that the brake caliper assembly includes a brake caliper and a mounting adapter. The brake caliper is configured to apply the braking force to the disc brake rotor. The mounting adapter is configured to couple the brake caliper to the bicycle frame. The mounting adapter is a separate member from the brake caliper. The mounting portion is configured to be mounted to at least one of the brake caliper and the mounting adapter.

In accordance with a twelfth aspect of the present invention, the rotor cover according to the tenth aspect further comprises a securing member configured to secure the cover body to the brake caliper assembly. The mounting portion includes a mounting opening through which the securing member extends.

In accordance with a thirteenth aspect of the present invention, the rotor cover according to the twelfth aspect is configured so that the mounting opening comprises a mounting through-hole through which the securing member extends.

In accordance with a fourteenth aspect of the present invention, the rotor cover according to the twelfth aspect is configured so that the mounting opening comprises a slot through which the securing member extends. The slot extends to an outer periphery of the cover body.

In accordance with a fifteenth aspect of the present invention, a rotor cover comprises a cover body and an axially extending portion. The cover body is configured to at least partially cover a disc brake rotor rotatable about a rotational center axis. The axially extending portion extends from an outer periphery of the cover body in an axial direction parallel to the rotational center axis. The axially extending portion is configured to be provided radially outward of the disc brake rotor.

In accordance with a sixteenth aspect of the present invention, the rotor cover according to the fifteenth aspect further comprises a radially extending portion extending radially inward from the axially extending portion. The radially extending portion is configured to be at least partially provided on an opposite side of the cover body relative to the disc brake rotor in the axial direction.

In accordance with a seventeenth aspect of the present invention, the rotor cover according to the sixteenth aspect is configured so that the radially extending portion is separated into a plurality of radially extending parts spaced apart from each other in a circumferential direction of the cover body. Each of the radially extending parts extends radially inward from the axially extending portion and is configured to be at least partially provided on the opposite side of the cover body relative to the disc brake rotor in the axial direction.

In accordance with an eighteenth aspect of the present invention, the rotor cover according to the seventeenth aspect is configured so that the axially extending portion is separated into a plurality of axially extending parts spaced apart from each other in the circumferential direction. Each of the axially extending parts extends from the outer periphery of the cover body in the axial direction and is configured to be provided radially outward of the disc brake rotor.

In accordance with a nineteenth aspect of the present invention, the rotor cover according to the eighteenth aspect is configured so that the radially extending parts respectively extend radially inward from the axially extending parts.

In accordance with a twentieth aspect of the present invention, a bicycle wheel assembly comprises a bicycle hub assembly, a disc brake rotor, and the rotor cover according to the fifteenth aspect. The bicycle hub assembly includes a hub axle, a hub shell, and a wheel securing structure. The hub shell is rotatably mounted to the hub axle. The wheel securing structure is configured to detachably couple the hub axle to a bicycle frame. The disc brake rotor is mounted to the bicycle hub assembly. The rotor cover includes a mounting hole. The wheel securing structure includes an axle rod. The axle rod is configured to extend through the mounting hole and a hub through-hole of the hub axle. The axle rod includes a rod body and an end portion. The rod body extends in an axial direction. The end portion is provided at an axial end of the rod body. The end portion is configured to be inserted in the mounting hole and the hub through-hole when the hub axle is coupled to the bicycle frame via the wheel securing structure. The end portion has an outer diameter which gradually decreases from the rod body in the axial direction.

In accordance with a twenty-first aspect of the present invention, the bicycle wheel assembly according to the twentieth aspect is configured so that the end portion has at least one of a tapered shape and a rounded shape.

In accordance with a twenty-second aspect of the present invention, a rotor cover comprises a cover portion and a contact portion. The cover portion is configured to at least partially cover a disc brake rotor mounted on a bicycle hub assembly configured to rotatably support the disc brake rotor relative to a bicycle frame. The contact portion is configured to be in contact with at least one of the bicycle hub assembly and the bicycle frame. The contact portion includes a friction increasing part configured to increase a friction between the contact portion and the at least one of the bicycle hub assembly and the bicycle frame.

In accordance with a twenty-third aspect of the present invention, the rotor cover according to the twenty-second aspect is configured so that the friction increasing part includes a first uneven surface configured to be in contact with the bicycle hub assembly. A friction coefficient defined between the first uneven surface and the bicycle hub assembly is larger than a friction coefficient defined between the cover portion and the bicycle hub assembly.

In accordance with a twenty-fourth aspect of the present invention, the rotor cover according to the twenty-second aspect is configured so that the friction increasing part includes a second uneven surface configured to be in contact with the bicycle frame. A friction coefficient defined between the second uneven surface and the bicycle frame is larger than a friction coefficient defined between the cover portion and the bicycle frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
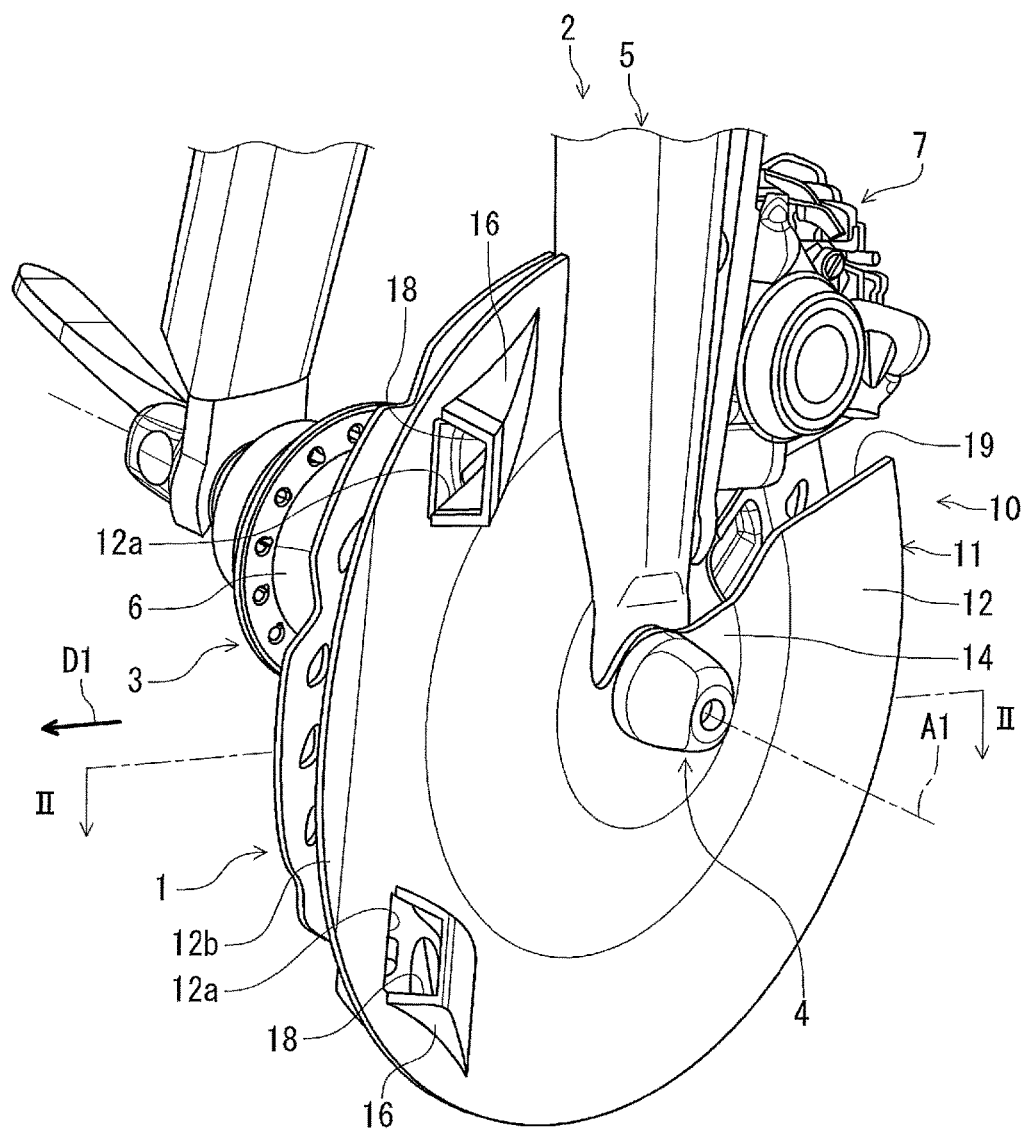
FIG. 1 is a perspective view of a rotor cover in accordance with a first embodiment which is mounted on a bicycle hub assembly.

The embodiments will now be described with reference to the accompanying drawings, wherein like reference numerals designate corresponding or identical elements throughout the various drawings.

First Embodiment

Referring initially to FIG. 1, a rotor cover 10 in accordance with a first embodiment comprises a cover body 11 configured to at least partially cover a disc brake rotor 1 rotatable relative to a bicycle frame 2 about a rotational center axis A1. The disc brake rotor 1 is mounted on a bicycle hub assembly 3. The bicycle hub assembly 3 is configured to rotatably support the disc brake rotor 1 relative to the bicycle frame 2. The rotor cover 10 is configured to be secured relative to the bicycle frame 2 with a wheel securing structure 4 of the bicycle hub assembly 3. In the illustrated embodiment, the disc brake rotor 1 is rotatable relative to a front fork 5 of the bicycle frame 2 about the rotational center axis A1. The disc brake rotor 1 is mounted on a hub shell 6 of the bicycle hub assembly 3. A brake caliper assembly 7 is mounted to the front fork 5 to apply a braking force to the disc brake rotor 1.

The cover body 11 includes a cover portion 12 and a mounting portion 14. The cover portion 12 is configured to at least partially cover the disc brake rotor 1. The mounting portion 14 is configured to be mounted on the bicycle hub assembly 3. The cover portion 12 is radially outwardly extending from the mounting portion 14 with respect to the rotational center axis A1 of the bicycle hub assembly 3. In the illustrated embodiment, the cover portion 12 is integrally provided with the mounting portion 14 as a single unitary member. However, the cover portion 12 can be a separate member from the mounting portion 14 if needed and/or desired.

At least one of the cover portion 12 and the mounting portion 14 is made of a metallic material. In the illustrated embodiment, the cover portion 12 and the mounting portion 14 are made of the metallic material such as aluminum, iron, titanium, or stainless steel. However, at least one of the cover portion 12 and the mounting portion 14 can be made of material other than the metallic material if needed and/or desired. For example, at least one of the cover portion 12 and the mounting portion 14 can be made of a resin material if needed and/or desired. In a case where the cover portion 12 is a separate member from the mounting portion 14, the cover portion 12 can be made of material different from material of the mounting portion 14. For example, the cover portion 12 can be made of a resin material while the mounting portion 14 is made of a metallic material.

In the illustrated embodiment, the mounting portion 14 is configured to be secured relative to the front fork 5 of the bicycle frame 2 with the wheel securing structure 4. However, the mounting portion 14 can be secured relative to portions other than the front fork 5 in the bicycle frame 2. In the illustrated embodiment, the wheel securing structure 4 is configured to releasably couple the bicycle hub assembly 3 to the front fork 5 of the bicycle frame 2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the rotor cover 10, should be interpreted relative to the bicycle equipped with the rotor cover 10 as used in an upright riding position on a horizontal surface.

As seen in FIG. 1, the cover body 11 further includes an air intake 16 configured to intake air into a space S1 (FIG. 2) between the cover portion 12 and the disc brake rotor 1. In the illustrated embodiment, the cover body 11 comprises a pair of air intakes 16 configured to intake air into the space S1 between the cover portion 12 and the disc brake rotor 1.

The air intake 16 includes an inlet opening 18 configured to face toward a traveling direction D1 of a bicycle. The traveling direction D1 of the bicycle is a direction in which the bicycle forward moves in a straight line during the pedaling. The traveling direction D1 can be also defined as a front direction of the bicycle.

The inlet opening 18 forward faces when the bicycle moves in the traveling direction D1. The cover portion 12 includes a pair of outlet openings 12a. The air intakes 16 are provided on the cover portion 12 to cover the outlet openings 12a. Air flows through the inlet openings 18 and the outlet openings 12a into the space S1 (FIG. 2) between the cover portion 12 and the disc brake rotor 1.

Figure 2:
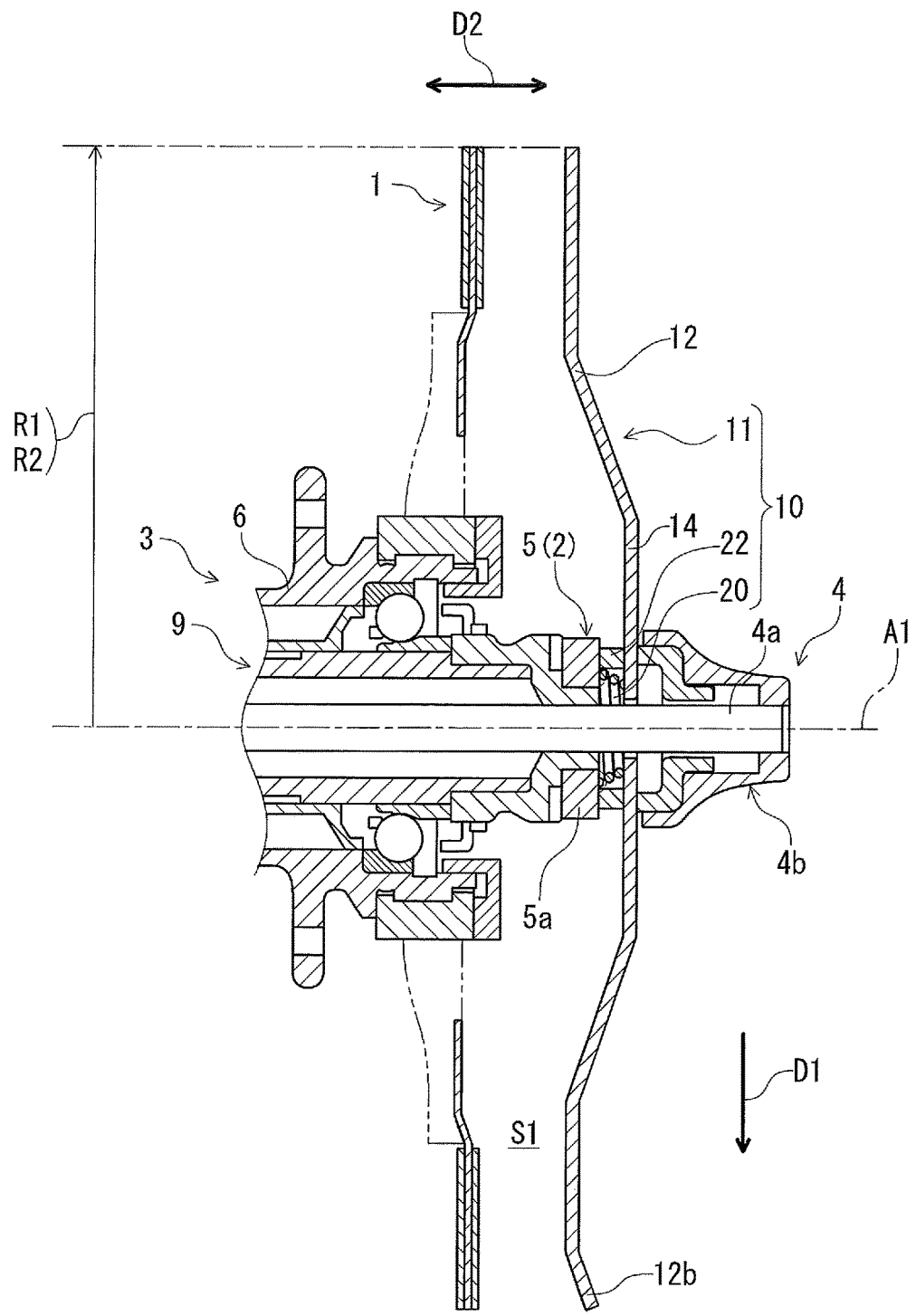
FIG. 2 is a cross-sectional view of a disc brake rotor, the bicycle hub assembly, and the rotor cover taken along line II-II of FIG. 1.

As seen in FIGS. 1 and 2, the cover portion 12 includes an inclined part 12b. The inclined part 12b is inclined relative to the traveling direction D1 in a state where the cover body 11 is mounted to the front fork 5 of the bicycle frame 2. The inclined part 12b is provided on a front side relative to the mounting portion 14. The inclined part 12b is configured to guide air to the space S1 (FIG. 2) between the cover portion 12 and the disc brake rotor 1.

As seen in FIG. 1, the cover body 11 further includes a cutout 19 to avoid interference between the cover body 11 and each of the front fork 5 and the brake caliper assembly 7. In the illustrated embodiment, the cutout 19 is provided on the cover portion 12 and the mounting portion 14. However, the cutout 19 can be provided only on the cover portion 12 if needed and/or desired. Furthermore, the cutout 19 can be omitted from the cover body 11 if the cover body 11 is provided to avoid the interference between the cover body 11 and each of the front fork 5 and the brake caliper assembly 7.

As seen in FIG. 2, the rotor cover 10 comprises a biasing member 20 configured to bias the cover body 11 in an axial direction D2 parallel to the rotational center axis A1. The biasing member 20 is provided between the cover body 11 and the bicycle frame 2 in the axial direction D2. The cover body 11 and the biasing member 20 are configured to be mounted to the bicycle hub assembly 3. The biasing member 20 comprises a coil spring configured to be compressed between the cover body 11 and the bicycle frame 2 in the axial direction D2. In the illustrated embodiment, the biasing member 20 comprises a coil spring. More specifically, the biasing member 20 comprises a tapered coil spring.

The rotor cover 10 further comprises a spacer 22 configured to be provided between the cover body 11 and the bicycle frame 2 in the axial direction D2. The spacer 22 is configured to be mounted to the bicycle hub assembly 3.

Figure 3:
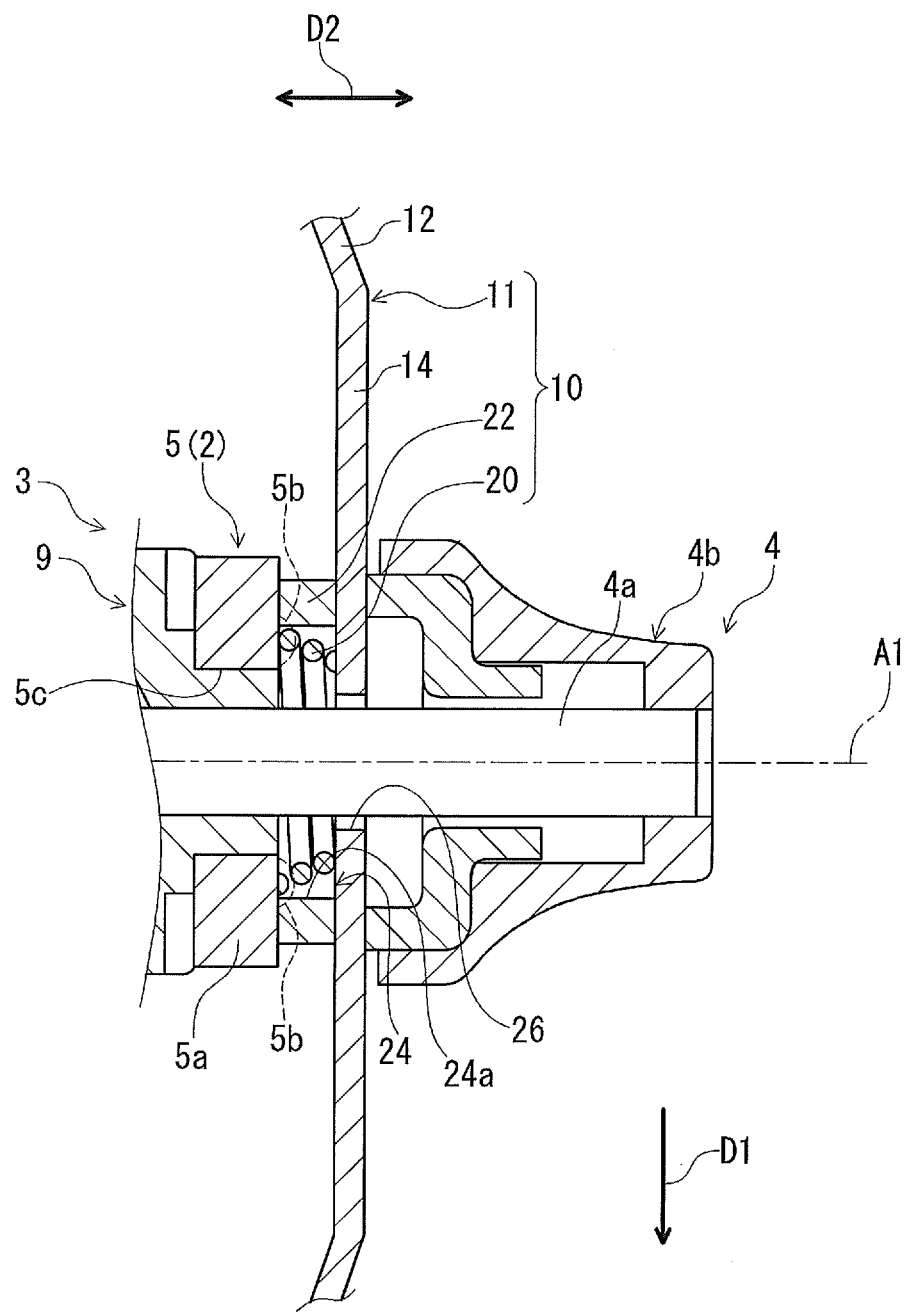
FIG. 3 is a partial enlarged cross-sectional view of the bicycle hub assembly and the rotor cover illustrated in FIG. 2.

As seen in FIG. 3, the spacer 22 include a cavity 24. The biasing member 20 is provided in the cavity 24 of the spacer 22. While the cavity 24 comprises a through-hole 24a extending in the axial direction D2, the construction of the cavity 24 is not limited to the illustrated embodiment. Possible examples of the cavity 24 include a hole, a recess, a groove, and a combination thereof. The biasing member 20 is provided in the through-hole 24*a*.

While the spacer 22 is a separate member from the cover body 11 in the illustrated embodiment, the spacer 22 can be integrally provided with the cover body 11 as a single unitary member if needed and/or desired. Furthermore, while the spacer 22 is a flat washer in the illustrated embodiment, other type of washer can be applied to the spacer 22 if needed and/or desired.

As seen in FIG. 2, a maximum outer radius of the cover portion 12 is greater than or equal to a maximum outer radius of the disc brake rotor 1. In the illustrated embodiment, a maximum outer radius R1 of the cover portion 12 is substantially equal to a maximum outer radius R2 of the disc brake rotor 1. However, the maximum outer radius of the cover portion 12 can be greater or smaller than the maximum outer radius of the disc brake rotor 1 if needed and/or desired. The maximum outer radii R1 and R2 are defined based on the rotational center axis A1.

As seen in FIG. 3, the mounting portion 14 is configured to be mounted on an outer surface of a rod 4*a* of the wheel securing structure 4. In the illustrated embodiment, the mounting portion 14 includes a mounting through-hole 26. The rod 4*a* of the wheel securing structure 4 extends through the biasing member 20, the through-hole 24*a* of the spacer 22, and the mounting through-hole 26 of the mounting portion 14 in a mounting state where the rotor cover 10 is mounted to the bicycle frame 2 with the wheel securing structure 4. The cover body 11 and the spacer 22 are mounted to the bicycle frame 2 (the front fork 5) together with the bicycle hub assembly 3. Furthermore, the rod 4*a* extends through a hub axle 9 of the bicycle hub assembly 3. As seen in FIG. 2, the hub axle 9 rotatably supports the hub shell 6 about the rotational center axis A1.

The mounting portion 14 is configured to be positioned between the bicycle frame 2 and a lock member 4*b* of the wheel securing structure 4. The lock member 4*b* is secured to an end of the rod 4*a*. The mounting portion 14 is sandwiched between the lock member 4*b* and the spacer 22 in the mounting state. The mounting portion 14 is in contact with each of the lock member 4*b* and the spacer 22 in the mounting state. While the lock member 4*b* is constituted by two parts, the lock member 4*b* can be integrally provided as a single unitary member if needed and/or desired.

Figure 4:
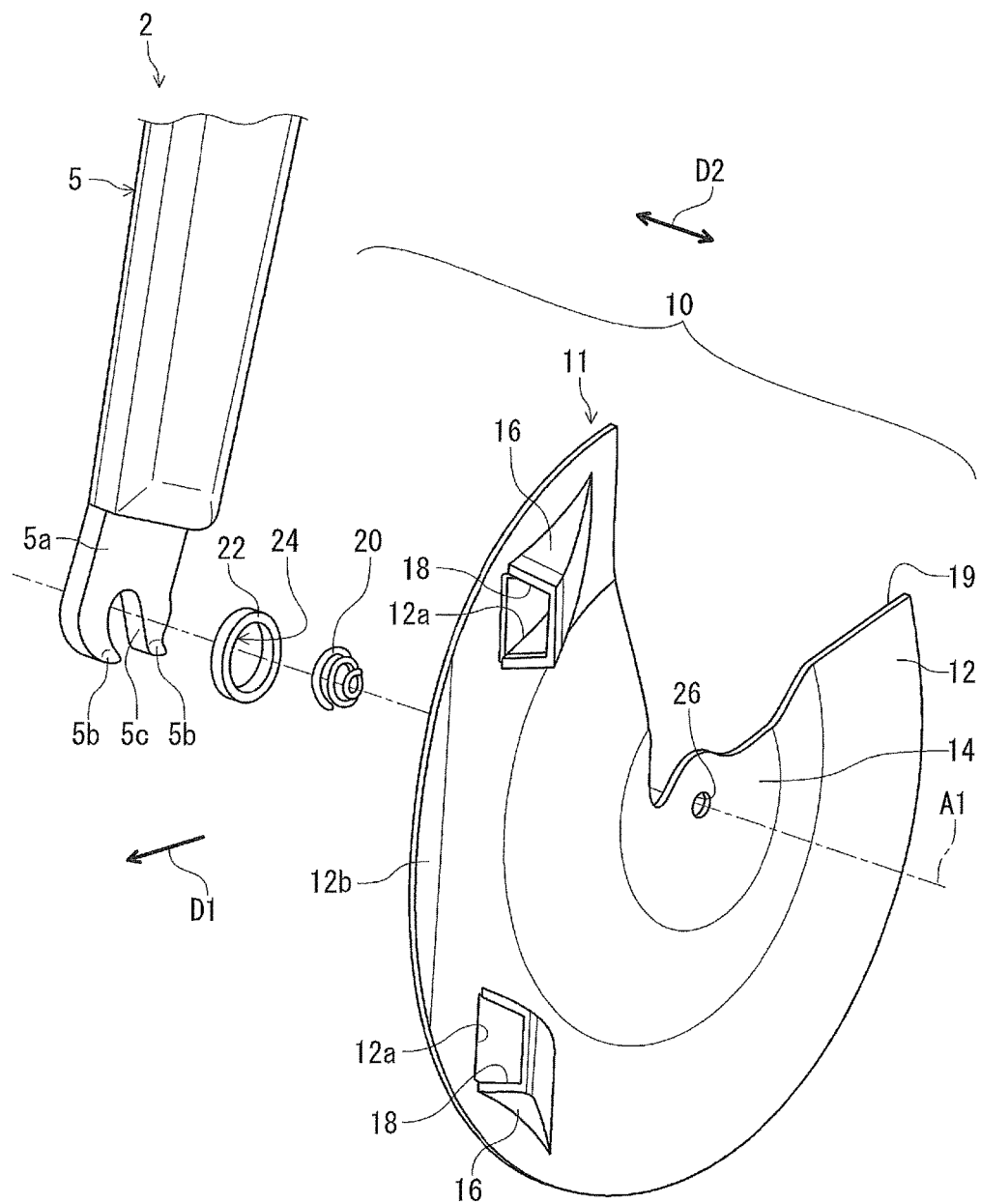
FIG. 4 is an exploded perspective view of a front fork, a spacer, a biasing member, and a cover body of the rotor cover illustrated in FIG. 1.

As seen in FIGS. 3 and 4, the front fork 5 includes a fork end 5*a* and a pair of protrusions 5*b*. The protrusions 5*b* are provided on the fork end 5*a* to extend from the fork end 5*a* toward the mounting portion 14. The fork end 5*a* includes a slot 5*c* disposed between the protrusions 5*b*. The protrusions 5*b* are provided to prevent the bicycle hub assembly 3 (FIG. 3) from being unintentionally removed from the bicycle frame 2 (the front fork 5).

As seen in FIG. 3, the spacer 22 is configured to prevent the mounting portion 14 from contacting the protrusions 5*b*. An outer periphery of the spacer 22 is contactable with the protrusions 5*b* of the fork end 5*a* to prevent the bicycle hub assembly 3 from being unintentionally removed from the bicycle frame 2 (the front fork 5).

Figure 5:
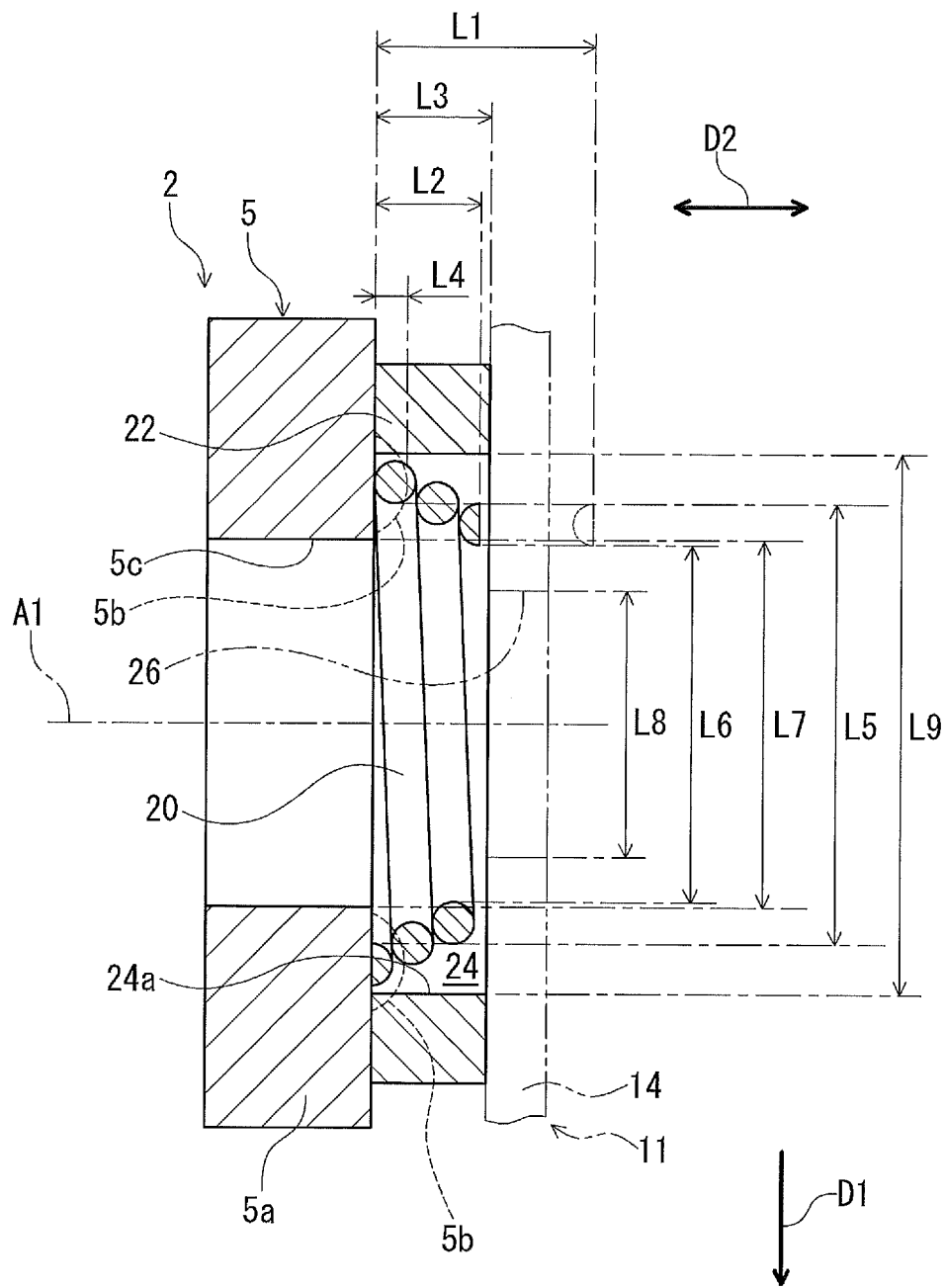
FIG. 5 is a partial enlarged cross-sectional view of the front fork, the spacer, and the biasing member illustrated in FIG. 4.

As seen in FIG. 5, the biasing member 20 has a maximum axial length L1 and a minimum axial length L2. The biasing member 20 has the maximum axial length L1 in a free state where a compressive force is not applied to the biasing member 20. The biasing member 20 has the minimum axial length L2 in a compressed state where the biasing member 20 is maximally compressed in the axial direction D2. An axial width L3 of the spacer 22 is smaller than the maximum axial length L1 of the biasing member 20 and larger than the minimum axial length L2 of the biasing member 20. The axial width L3 of the spacer 22 is larger than an axial length L4 of the protrusions 5*b*.

The biasing member 20 has a maximum inner diameter L5 and a minimum inner diameter L6. The maximum inner diameter L5 is larger than the minimum inner diameter L6. The maximum inner diameter L5 is larger than a width L7 of the slot 5*c* of the front fork 5. The minimum inner diameter L6 is smaller than the width L7 of the slot 5*c*. The width L7 of the slot 5*c* is defined in the traveling direction D1. The minimum inner diameter L6 is larger than an inner diameter L8 of the mounting through-hole 26 of the mounting portion 14. The through-hole 24*a* has an inner diameter L9 greater than the width L7 of the slot 5*c* and the inner diameter L8 of the mounting through-hole 26. The relationship between sizes of the biasing member 20, the spacer 22, the mounting through-hole 26, and the slot 5*c* of the fork end 5*a* are not limited to the illustrated embodiment.

With the rotor cover 10, as seen in FIG. 3, the biasing member 20 is provided between the cover body 11 and the bicycle frame 2 in the axial direction D2. This arrangement moves the rotor cover 10 away from the bicycle frame 2 during maintenance, allowing the rotor cover 10 to be easily detached from the bicycle frame 2. Accordingly, it is possible to improve the maintenance of the rotor cover 10.

Second Embodiment

A rotor cover 210 in accordance with a second embodiment will be described below referring to FIG. 6. The rotor cover 210 has the same configuration as the rotor cover 10 except for the spacer 22. Thus, elements having substantially the same function as those in the first embodiment will be numbered the same here, and will not be described and/or illustrated again in detail here for the sake of brevity.

Figure 6:
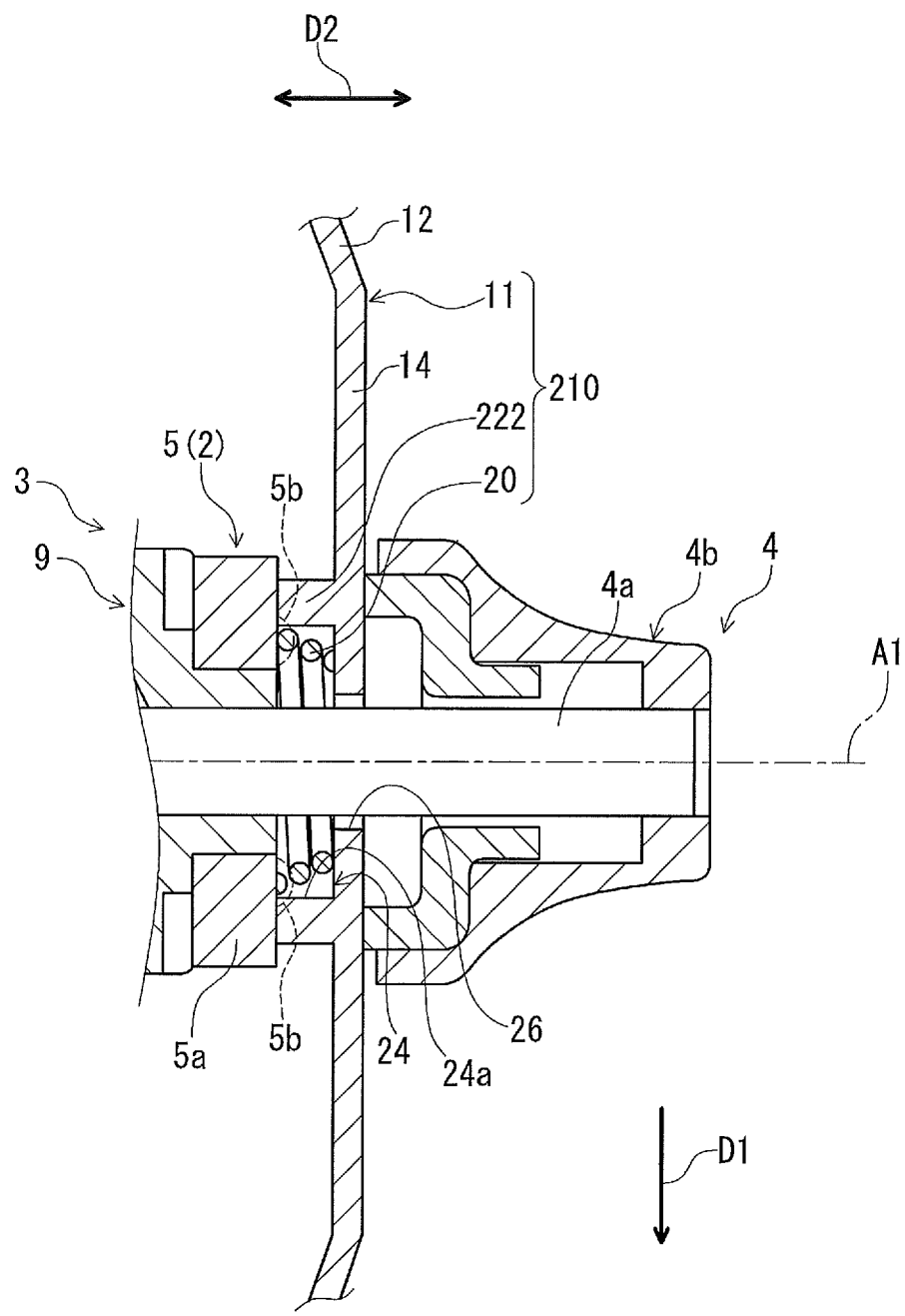
FIG. 6 is a partial enlarged cross-sectional view of a bicycle hub assembly and a rotor cover in accordance with a second embodiment.

As seen in FIG. 6, the rotor cover 210 comprises a spacer 222 configured to be provided between the cover body 11 and the bicycle frame 2 in the axial direction D2. In the illustrated embodiment, the spacer 222 is integrally provided with the cover body 11 as a single unitary member. The spacer 222 includes the cavity 24.

With the rotor cover 210, it is possible to obtain substantially the same advantageous effect as that of the rotor cover 10 in accordance with the first embodiment.

Third Embodiment

A rotor cover 310 in accordance with a third embodiment will be described below referring to FIG. 7. The rotor cover 310 has the same configuration as the rotor cover 10 except for the biasing member 20. Thus, elements having substantially the same function as those in the above embodiments will be numbered the same here, and will not be described and/or illustrated again in detail here for the sake of brevity.

Figure 7:
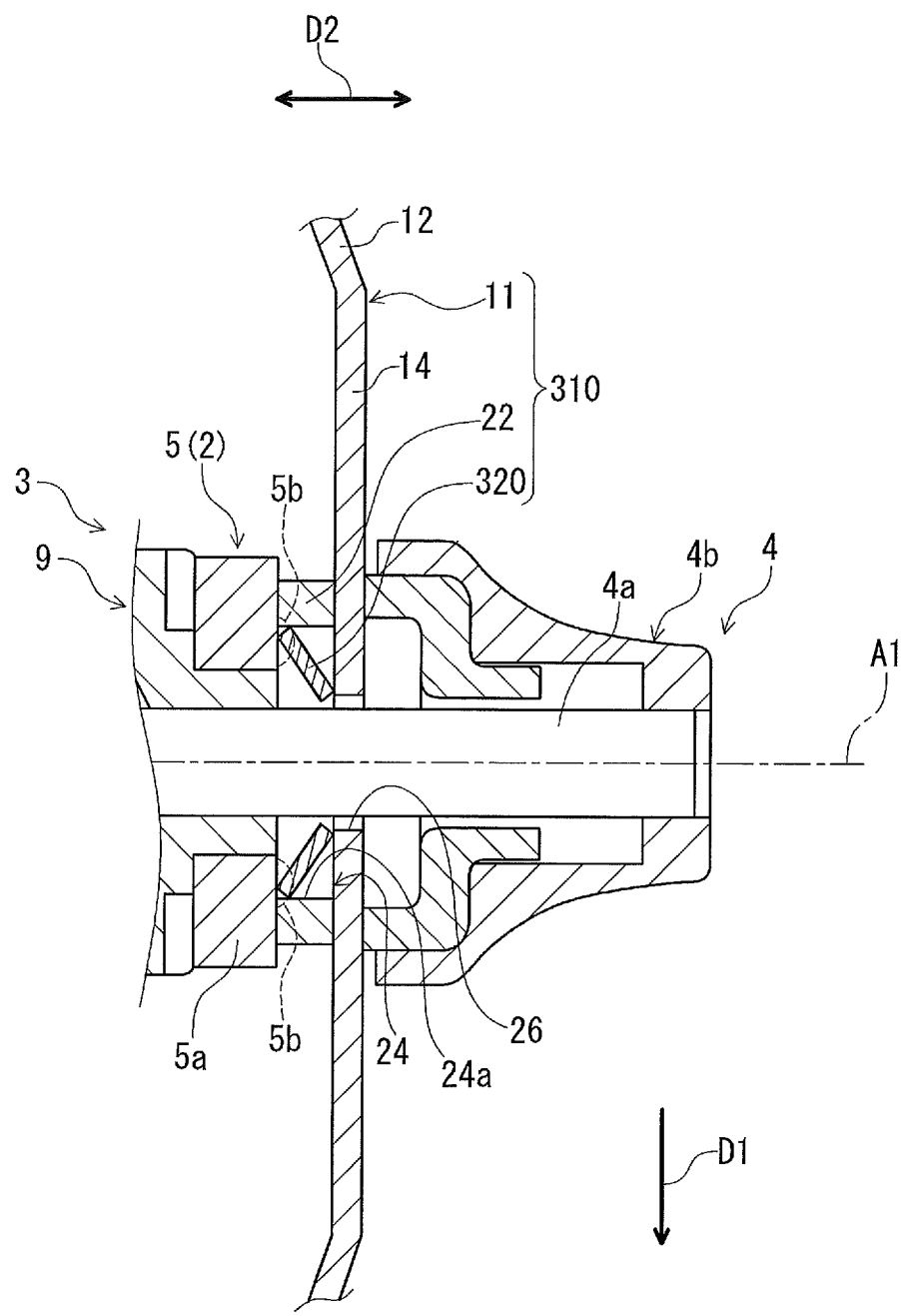
FIG. 7 is a partial enlarged cross-sectional view of a bicycle hub assembly and a rotor cover in accordance with a third embodiment.

As seen in FIG. 7, the rotor cover 310 comprises a biasing member 320 configured to bias the cover body 11 in the axial direction D2. The biasing member 320 is provided between the cover body 11 and the bicycle frame 2 in the axial direction D2. In the illustrated embodiment, the biasing member 320 comprises a spring washer configured to be compressed between the cover body 11 and the bicycle frame 2 in the axial direction D2.

With the rotor cover 310, it is possible to obtain substantially the same advantageous effect as that of the rotor cover 10 in accordance with the first embodiment.

Fourth Embodiment

A rotor cover 410 in accordance with a fourth embodiment will be described below referring to FIGS. 8 to 10. The rotor cover 410 has the same configuration as the rotor cover 10 except for the cover body 11. Thus, elements having substantially the same function as those in the above embodiments will be numbered the same here, and will not be described and/or illustrated again in detail here for the sake of brevity.

Figure 8:
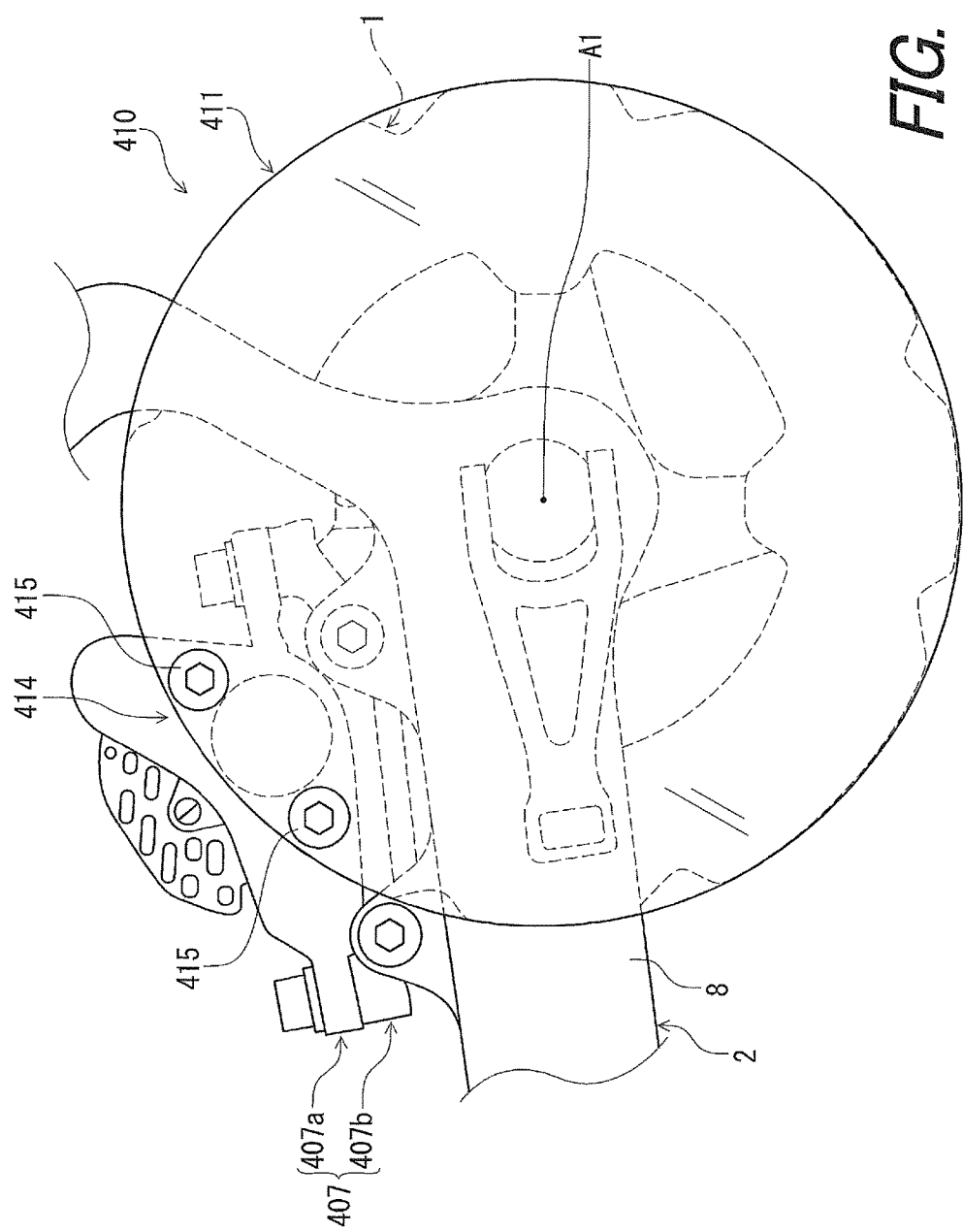
FIG. 8 is a side elevational view of a rotor cover in accordance with a fourth embodiment which is mounted on a bicycle hub assembly.

As seen in FIG. 8, the rotor cover 410 comprises a cover body 411 configured to at least partially cover the disc brake rotor 1 rotatable relative to the bicycle frame 2 about the rotational center axis A1. The cover body 411 includes a mounting portion 414 configured to be mounted to a brake caliper assembly 407 configured to apply a braking force to the disc brake rotor 1. In the illustrated embodiment, the brake caliper assembly 407 is a rear brake caliper assembly and is mounted on a chainstay 8 of the bicycle frame 2.

The brake caliper assembly 407 includes a brake caliper 407a and a mounting adapter 407b. The brake caliper 407a is configured to apply the braking force to the disc brake rotor 1. The mounting adapter 407b is configured to couple the brake caliper 407a to the bicycle frame 2. In the illustrated embodiment, the mounting adapter 407b is configured to couple the brake caliper 407a to the chainstay 8 of the bicycle frame 2. While the mounting adapter 407b is a separate member from the brake caliper 407a in the illustrated embodiment, the mounting adapter 407b can be integrally provided with the brake caliper 407a or omitted from the brake caliper assembly 407 if needed and/or desired.

As seen in FIG. 8, the mounting portion 414 is configured to be mounted to at least one of the brake caliper 407a and the mounting adapter 407b. While the mounting portion 414 is configured to be mounted to the brake caliper 407a in the illustrated embodiment, the mounting portion 414 can be mounted to the mounting adapter 407b or both the brake caliper 407a and the mounting adapter 407b.

The rotor cover 410 further comprises a securing member configured to secure the cover body 411 to the brake caliper assembly 407. In the illustrated embodiment, the rotor cover 410 further comprises securing members 415 configured to secure the cover body 411 to the brake caliper 407a. While the rotor cover 410 includes two securing members 415, the rotor cover 410 can include only one securing members or more than three securing members if needed and/or desired.

Figure 9:
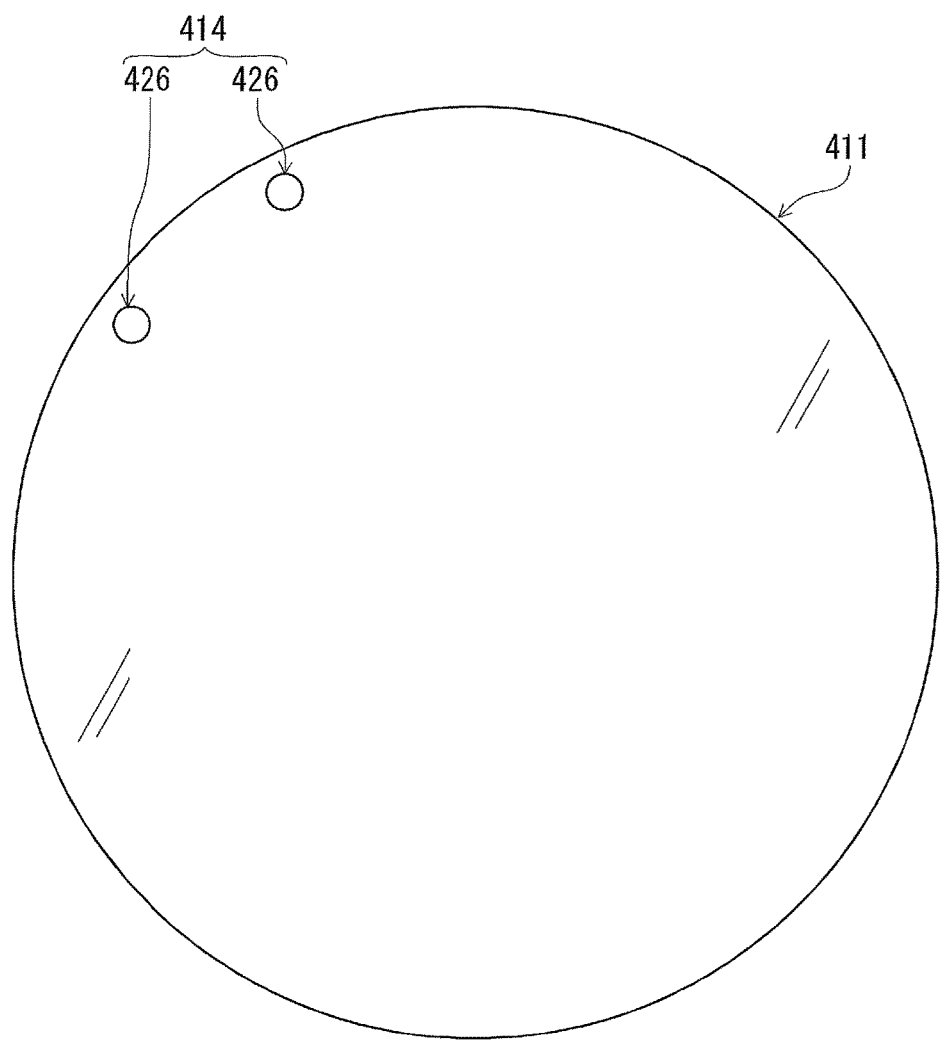
FIG. 9 is a side elevational view of a cover body of the rotor cover illustrated in FIG. 8.

As seen in FIG. 9, the mounting portion 414 includes a mounting opening through which the securing member 415 (FIG. 8) extends. In the illustrated embodiment, the mounting portion 414 includes mounting openings 426 through which the securing members 415 respectively extends. The mounting opening 426 comprises a mounting through-hole through which the securing member 415 (FIG. 8) extends. While the mounting portion 414 includes two mounting openings 426, the mounting portion 414 can include only one mounting opening or more than three mounting openings if needed and/or desired.

Figure 10:
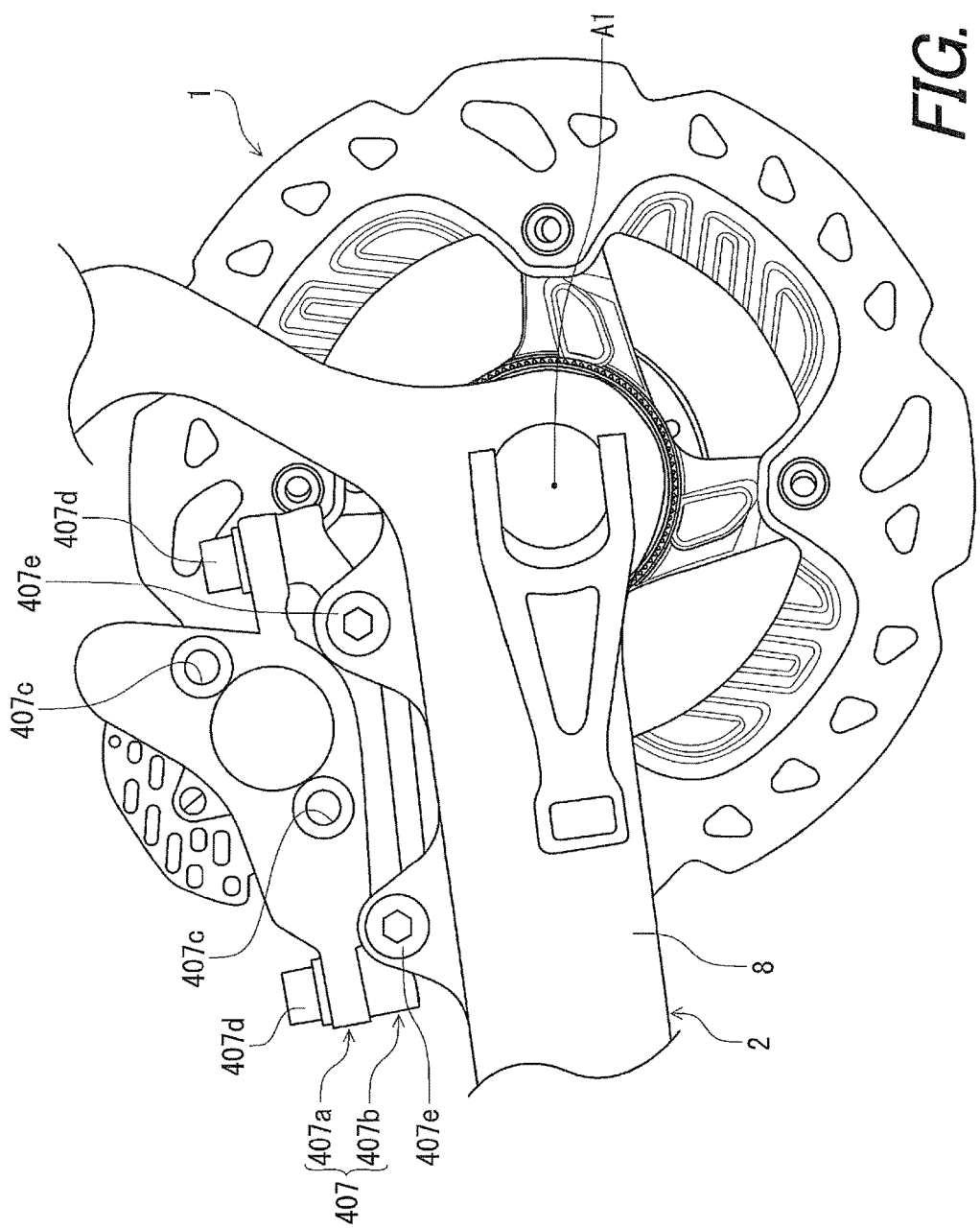
FIG. 10 is a side elevational view of the bicycle hub assembly, a disc brake rotor, and a bicycle frame without the rotor cover.

As seen in FIG. 10, the brake caliper 407a includes threaded holes 407c. The securing members 415 (FIG. 8) threadedly engage with the threaded holes 407c to couple the cover body 411 (FIG. 8) to the brake caliper assembly 407. The brake caliper 407a is secured to the mounting adapter 407b via first attachment bolts 407d. The mounting adapter 407b is secured to the chainstay 8 of the bicycle frame 2 via second attachment bolts 407e. Namely, the cover body 411 is secured to the bicycle frame 2 via the brake caliper assembly 407.

With the rotor cover 410, since the cover body 411 including the mounting portion 414 configured to be mounted to the brake caliper assembly 407, it is possible to omit portions to which the cover body 411 is mounted from the bicycle frame 2. Accordingly, the rotor cover 410 makes the construction of the bicycle frame 2 more simple than a rotor cover which is directly mounted to the bicycle frame.

Fifth Embodiment

A rotor cover 510 in accordance with a fifth embodiment will be described below referring to FIGS. 11 and 12. The rotor cover 510 has the same configuration as the rotor cover 410 except for the mounting opening 426. Thus, elements having substantially the same function as those in the above embodiments will be numbered the same here, and will not be described and/or illustrated again in detail here for the sake of brevity.

Figure 11:
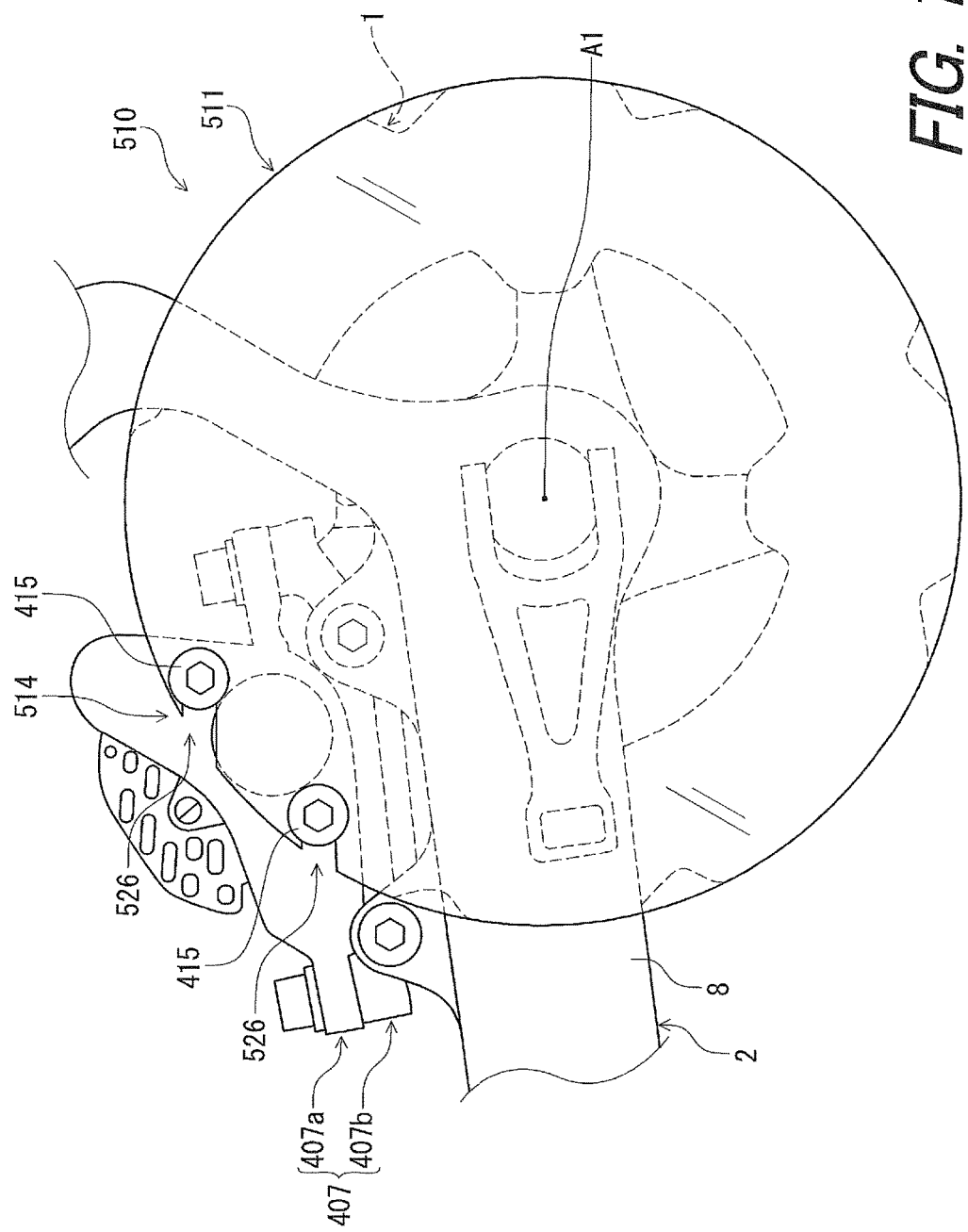
FIG. 11 is a side elevational view of a rotor cover in accordance with a fifth embodiment which is mounted on a bicycle hub assembly.

As seen in FIG. 11, the rotor cover 510 comprises a cover body 511 including a mounting portion 514 configured to be mounted to the brake caliper assembly 407. The mounting portion 514 includes a mounting opening through which the securing member 415 extends. In the illustrated embodiment, the mounting portion 514 includes mounting openings 526 through which the securing members 415 extends. While the mounting portion 514 includes two mounting openings 526, the mounting portion 514 can include only one mounting opening or more than three mounting openings if needed and/or desired.

Figure 12:
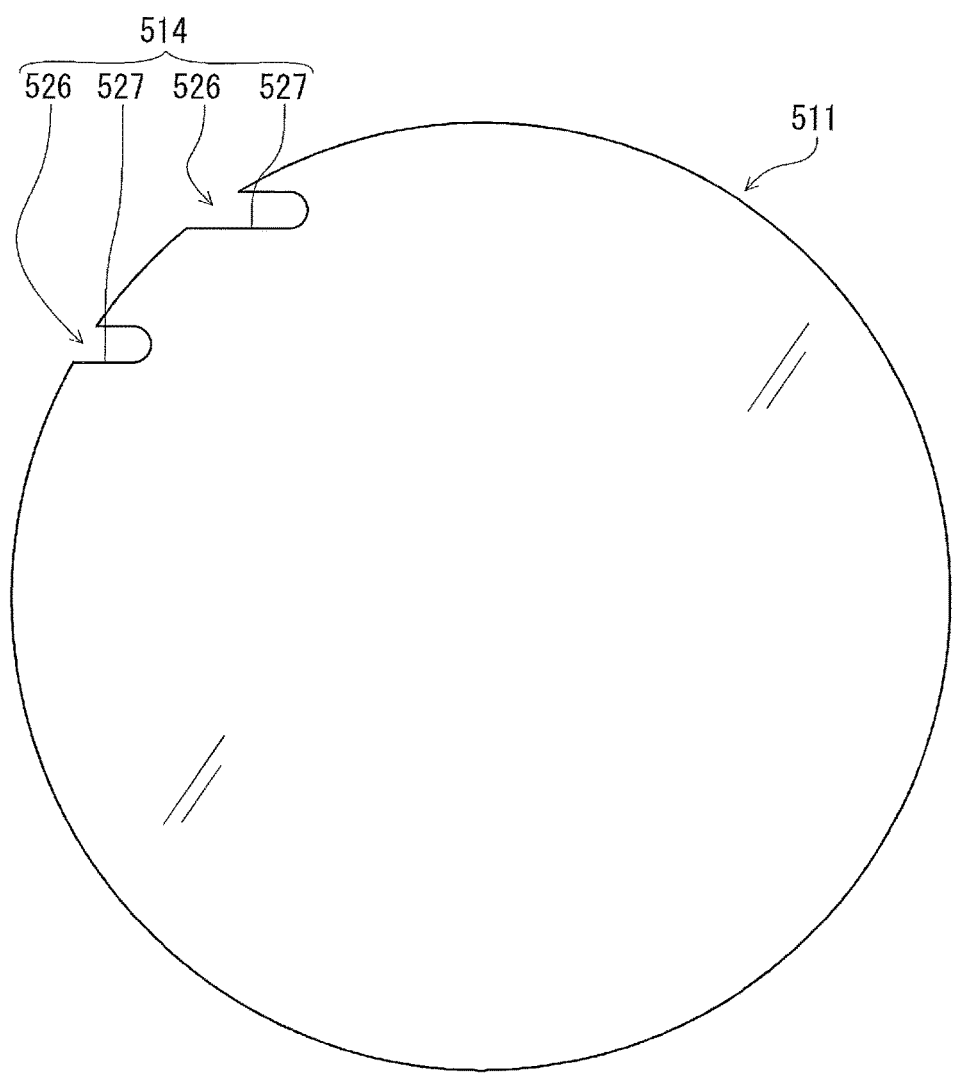
FIG. 12 is a side elevational view of a cover body of the rotor cover illustrated in FIG. 11.

As seen in FIG. 12, the cover body 511 has substantially the same construction as that of the cover body 411 in accordance with the fourth embodiment. Unlike the mounting opening 426 in accordance with the fourth embodiment, however, the mounting opening 526 comprises a slot 527 through which the securing member 415 extends. The slot 527 extends to an outer periphery of the cover body 511. In the illustrated embodiment, the slots 527 extends in the same direction.

With the rotor cover 510, it is possible to obtain substantially the same advantageous effect as that of the rotor cover 410 in accordance with the fourth embodiment. Furthermore, the slots 527 allows the cover body 511 to be more easily detached from the brake caliper assembly 407 than through-holes.

Sixth Embodiment

A rotor cover 610 and a bicycle wheel assembly 650 in accordance with a sixth embodiment will be described below referring to FIGS. 13 to 18. The rotor cover 610 has the same configuration as the rotor cover 10 except for the cover body 11. Thus, elements having substantially the same function as those in the above embodiments will be numbered the same here, and will not be described and/or illustrated again in detail here for the sake of brevity.

Figure 13:
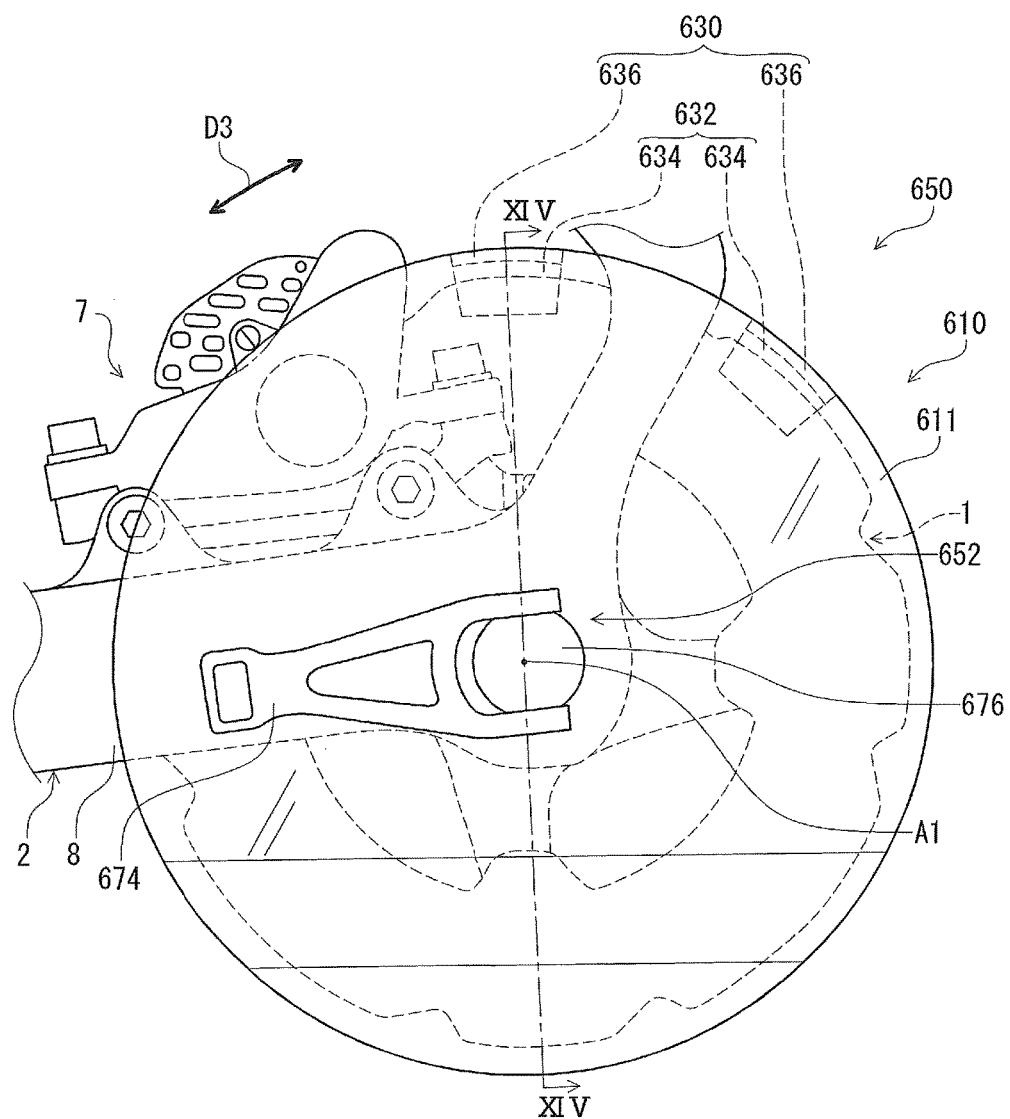
FIG. 13 is a side elevational view of a rotor cover in accordance with a sixth embodiment which is mounted on a bicycle hub assembly.

As seen in FIG. 13, the rotor cover 610 comprises a cover body 611. The cover body 611 is configured to at least partially cover the disc brake rotor 1 rotatable about the rotational center axis A1. The cover body 611 has an outer diameter larger than an outer diameter of the disc brake rotor 1.

Figure 14:
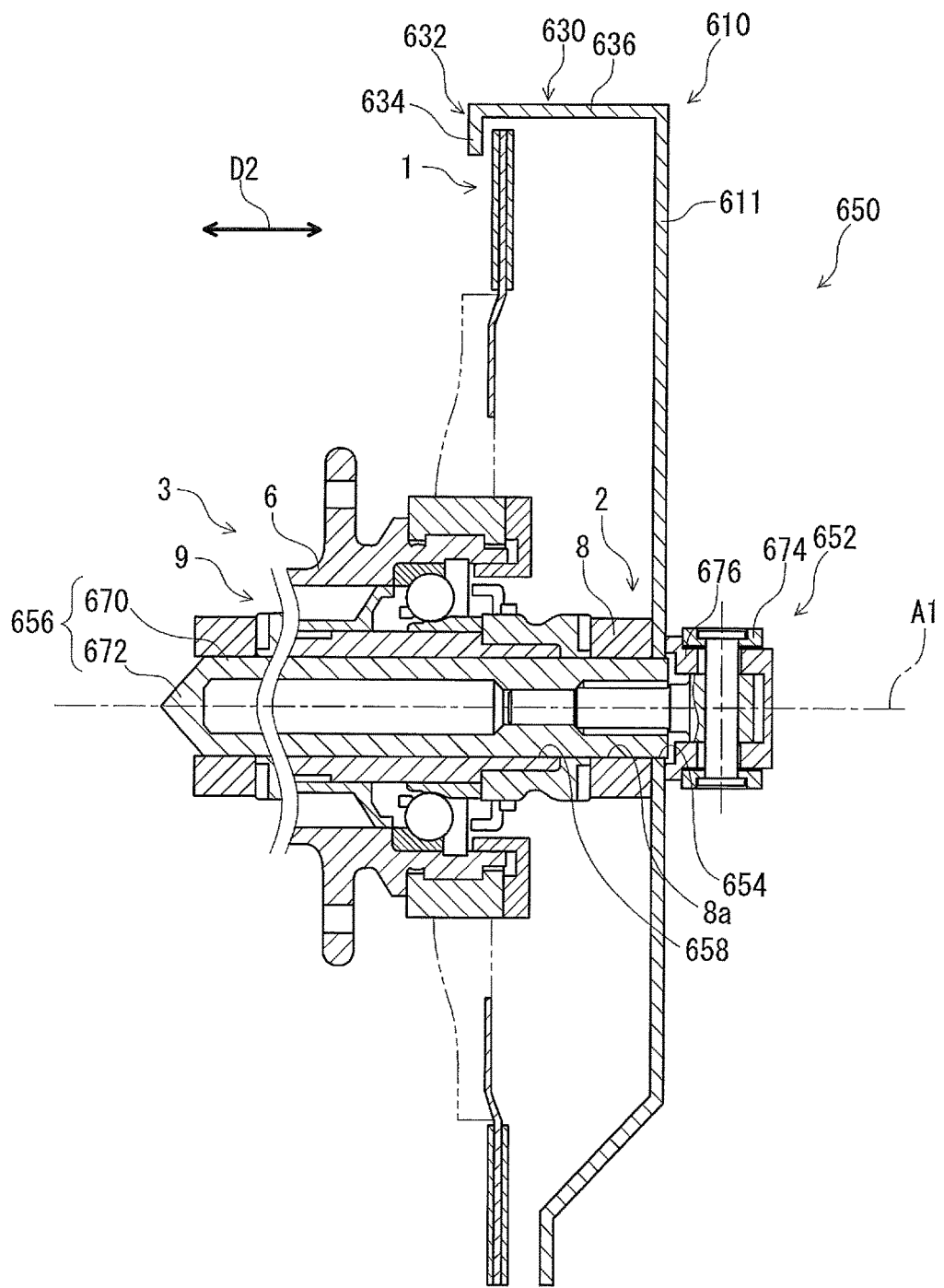
FIG. 14 is a cross-sectional view of a disc brake rotor, the bicycle hub assembly, and the rotor cover taken along line XIV-XIV of FIG. 13.

As seen in FIG. 14, the rotor cover 610 comprises an axially extending portion 630. The axially extending portion 630 extends from an outer periphery of the cover body 611 in the axial direction D2 parallel to the rotational center axis A1. The axially extending portion 630 is configured to be provided radially outward of the disc brake rotor 1.

The rotor cover 610 further comprises a radially extending portion 632 extending radially inward from the axially extending portion 630. The radially extending portion 632 is configured to be at least partially provided on an opposite side of the cover body 611 relative to the disc brake rotor 1 in the axial direction D2.

As seen in FIG. 13, the radially extending portion 632 is separated into a plurality of radially extending parts 634 spaced apart from each other in a circumferential direction D3 of the cover body 611. The axially extending portion 630 is separated into a plurality of axially extending parts 636 spaced apart from each other in the circumferential direction D3. In the illustrated embodiment, the radially extending portion 632 is separated into two radially extending parts 634, and the axially extending portion 630 is separated into two axially extending parts 636. However, the radially extending portion 632 can be separate into more than three radially extending parts and can be a single part if needed and/or desired. Similarly, the axially extending portion 630 can be separate into more than three axially extending parts and can be a single part if needed and/or desired.

As seen in FIG. 14, each of the axially extending parts 636 extends from the outer periphery of the cover body 611 in the axial direction D2. As seen in FIGS. 13 and 14, each of the axially extending parts 636 is configured to be provided radially outward of the disc brake rotor 1. In the illustrated embodiment, as seen in FIG. 13, the axially extending portion 630 (the axially extending parts 636) is provided above the rotational center axis A1 in a mounting state where the rotor cover 610 is mounted to the bicycle frame 2.

As seen in FIG. 14, each of the radially extending parts 634 extends radially inward from the axially extending portion 630. Each of the radially extending parts 634 is configured to be at least partially provided on the opposite side of the cover body 611 relative to the disc brake rotor 1 in the axial direction D2. The radially extending parts 634 respectively extend radially inward from the axially extending parts 636. In the illustrated embodiment, as seen in FIG. 13, the radially extending portion 632 (the radially extending parts 634) is provided above the rotational center axis A1 in the mounting state.

As seen in FIG. 14, the bicycle wheel assembly 650 comprises the bicycle hub assembly 3, the disc brake rotor 1, and the rotor cover 610. The bicycle hub assembly 3 includes the hub axle 9, the hub shell 6, and a wheel securing structure 652. The hub shell 6 is rotatably mounted to the hub axle 9. The wheel securing structure 652 is configured to detachably couple the hub axle 9 to the bicycle frame 2 (e.g., the chainstay 8).

The rotor cover 610 includes a mounting hole 654. More specifically, the cover body 611 includes the mounting hole 654. The wheel securing structure 652 includes an axle rod 656 configured to extend through the mounting hole 654 and a hub through-hole 658 of the hub axle 9. The axle rod 656 includes a rod body 670 and an end portion 672. The rod body 670 extends in the axial direction D2. The end portion 672 is provided at an axial end of the rod body 670.

Figure 15:
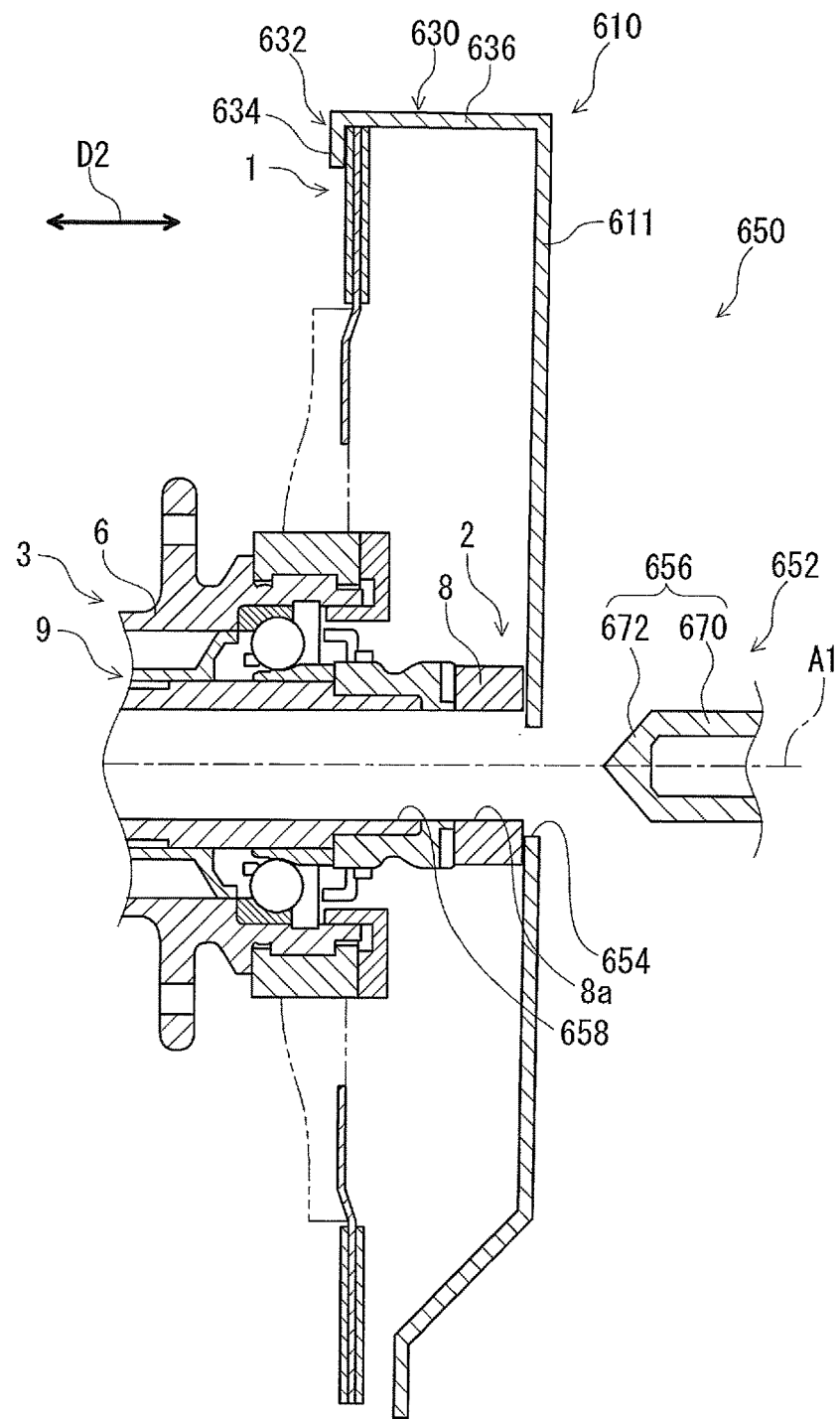
FIG. 15 is a cross-sectional view of the disc brake rotor, the bicycle hub assembly, and the rotor cover for explaining a process of assembling the bicycle hub assembly and the rotor cover.
Figure 16:
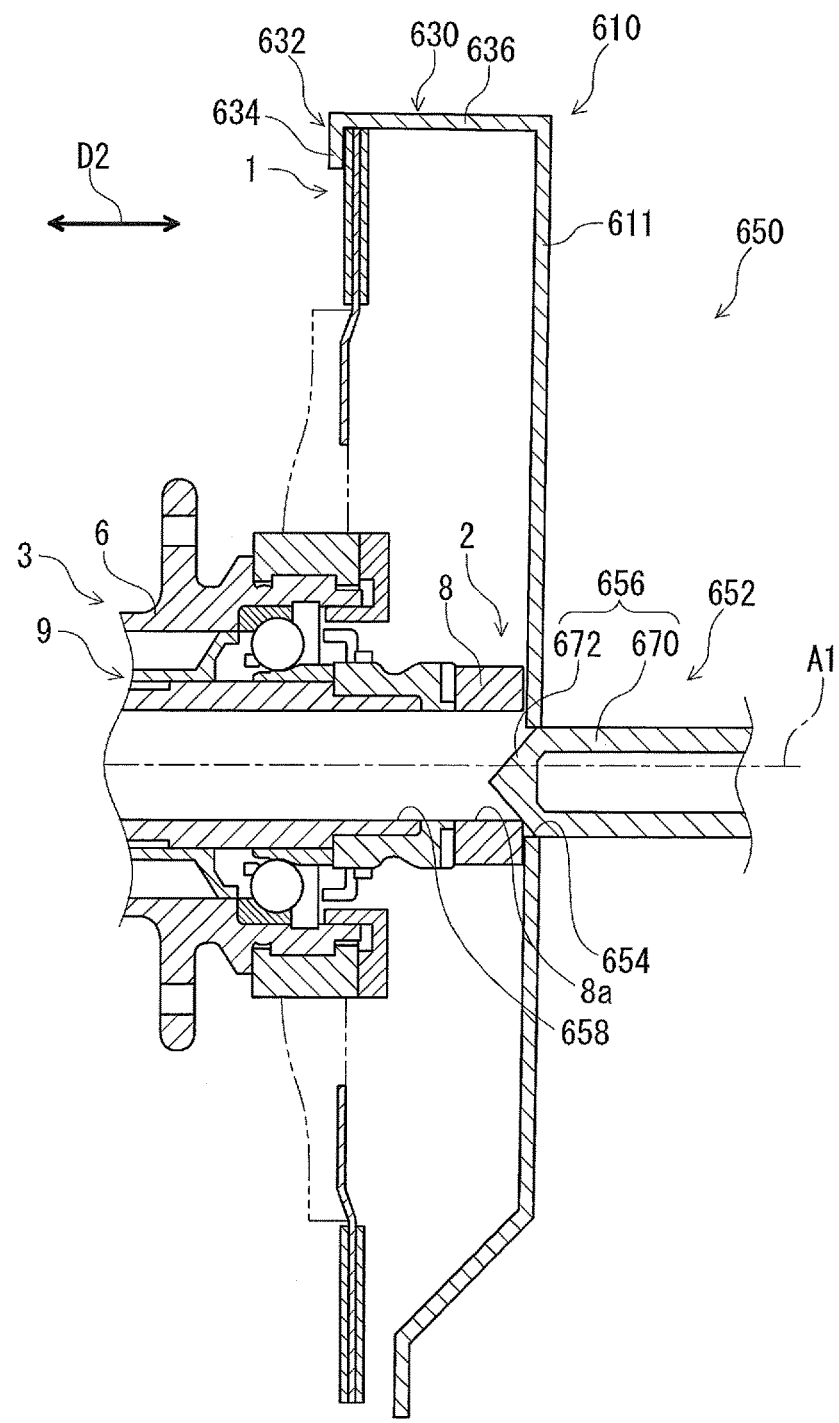
FIG. 16 is a cross-sectional view of the disc brake rotor, the bicycle hub assembly, and the rotor cover for explaining a process of assembling the bicycle hub assembly and the rotor cover.
Figure 17:
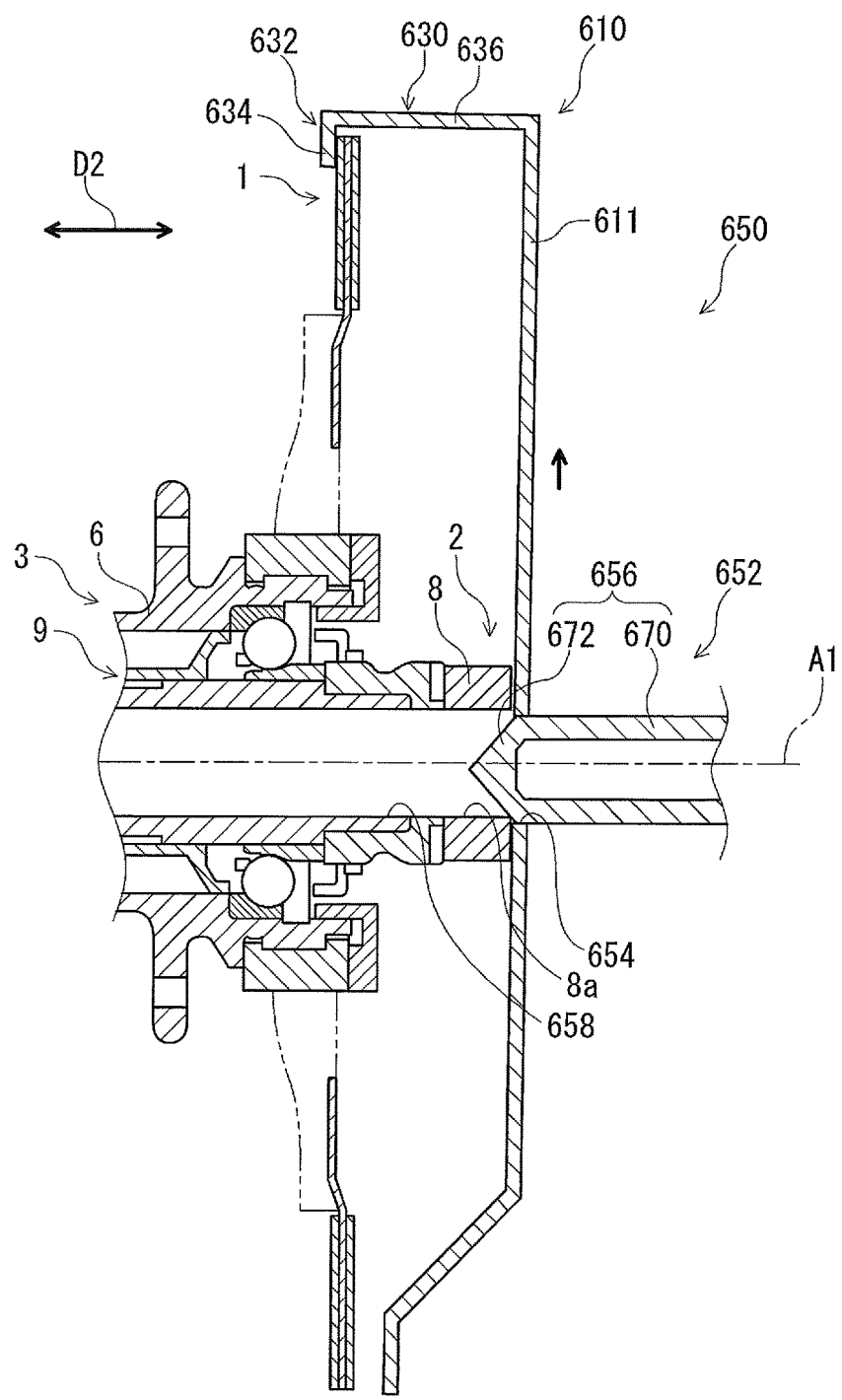
FIG. 17 is a cross-sectional view of the disc brake rotor, the bicycle hub assembly, and the rotor cover for explaining a process of assembling the bicycle hub assembly and the rotor cover.

As seen in FIGS. 15 to 17, the end portion 672 is configured to be inserted in the mounting hole 654 and the hub through-hole 658 when the hub axle 9 is coupled to the bicycle frame 2 via the wheel securing structure 652. The end portion 672 has an outer diameter which gradually decreases from the rod body 670 in the axial direction D2. The end portion 672 has at least one of a tapered shape and a rounded shape. In the illustrated embodiment, the end portion 672 has a tapered shape. The rotor cover 610 is held at a covering position by the bicycle frame 2 and the wheel securing structure 652 in the mounting state. The rotor cover 610 is not in contact with the disc brake rotor 1 at the covering position.

As seen in FIG. 15, the axially extending portion 630 and the radially extending portion 632 engage with the disc brake rotor 1 in a state where the wheel securing structure 652 is detached from the bicycle frame 2 and the hub axle 9. The cover body 611 is in contact with the chainstay 8 of the bicycle frame 2. In this state, the rotor cover 610 is supported by the disc brake rotor 1 via the axially extending portion 630 and the radially extending portion 632. Accordingly, it is possible to keep a covering state where the rotor cover 610 covers at least partially the disc brake rotor 1 during the maintenance of the bicycle wheel assembly 650.

As seen in FIGS. 16 and 17, the rotor cover 610 is guided by the axle rod 656 toward the covering position (FIG. 14) relative to the bicycle frame 2 when the end portion 672 of the axle rod 656 is inserted into the mounting hole 654 of the cover body 611. In the illustrated embodiment, the end portion 672 slides with the cover body 611 and the chainstay 8 to guide the rotor cover 610 toward the covering position relative to the bicycle frame 2.

Figure 18:
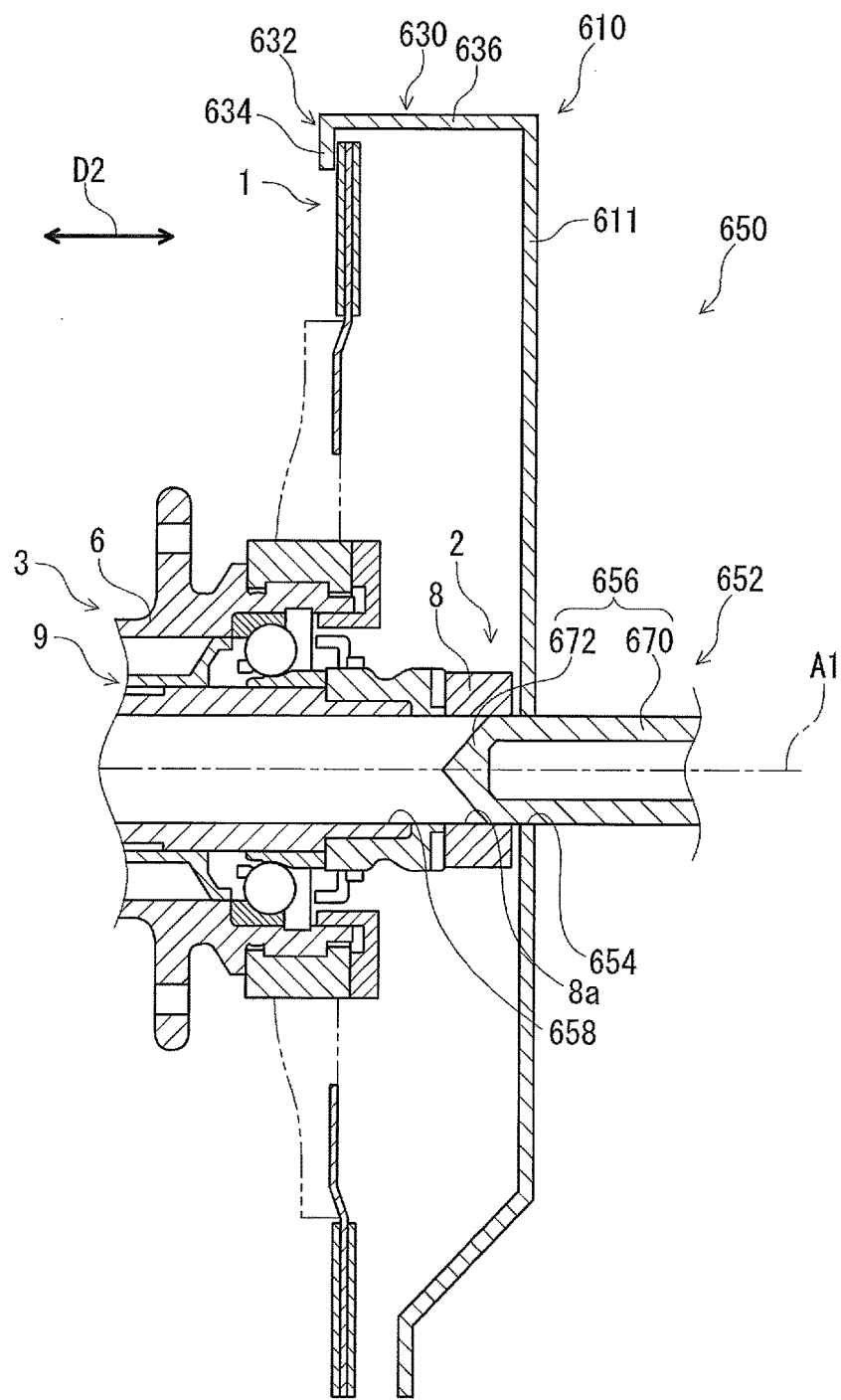
FIG. 18 is a cross-sectional view of the disc brake rotor, the bicycle hub assembly, and the rotor cover for explaining a process of assembling the bicycle hub assembly and the rotor cover.

As seen in FIG. 18, a center of the rotor cover 610 substantially coincides with the rotational center axis A1 when the rod body 670 is inserted into the mounting hole 654 of the cover body 611, an attachment hole 8a of the chainstay 8, and the hub through-hole 658 of the hub axle 9.

Figure 19:
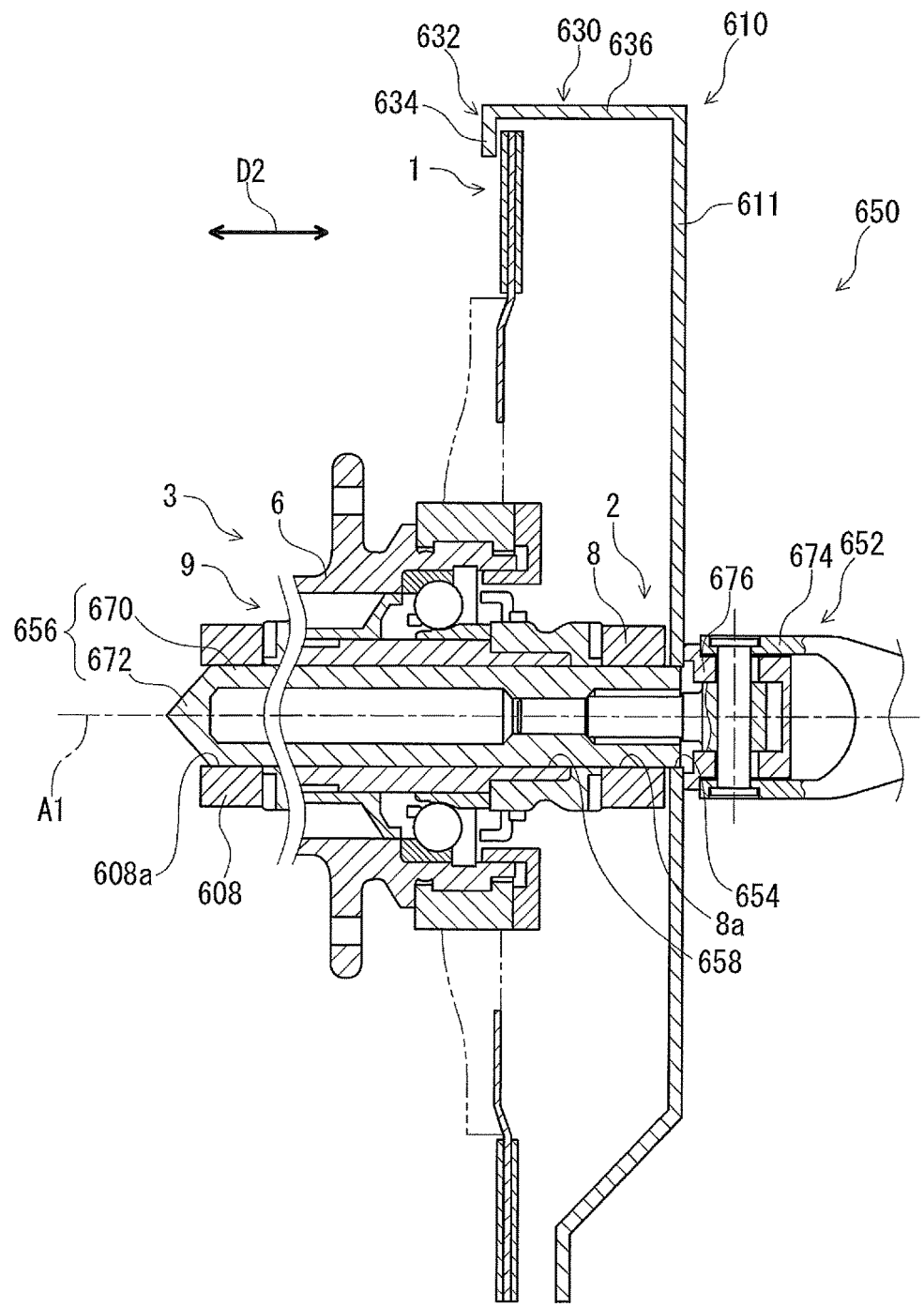
FIG. 19 is a cross-sectional view of the disc brake rotor, the bicycle hub assembly, and the rotor cover for explaining a process of assembling the bicycle hub assembly and the rotor cover.

As seen in FIG. 19, the end of the rod body 670 has an external thread (not shown) and is screwed in a threaded hole 608a of an additional chainstay 608. A pivotal movement of a cam lever 674 of the wheel securing structure 652 presses a lock member 676 toward the bicycle frame 2 in the axial direction D2, causing the rotor cover 610 to be held between the lock member 676 and the bicycle frame 2 as seen in FIG. 14.

With the rotor cover 610, the axially extending portion 630 extends from the outer periphery of the cover body 611 in the axial direction D2 parallel to the rotational center axis A1. The axially extending portion 630 is configured to be provided radially outward of the disc brake rotor 1. Accordingly, it is possible to keep a covering state where the rotor cover 610 covers at least partially the disc brake rotor 1 during the maintenance of the bicycle wheel assembly 650.

Furthermore, with the bicycle wheel assembly 650, since the end portion 672 has the outer diameter which gradually decreases from the rod body 670 in the axial direction D2, it is possible to easily insert the axle rod 656 into the mounting hole 654 and the hub through-hole 658 even if the mounting hole 654 is offset from the hub through-hole 658. Accordingly, it is possible to easily adjust the relative position between the rotor cover 610 and the disc brake rotor 1 using the end portion 672 of the axle rod 656.

Figure 20:
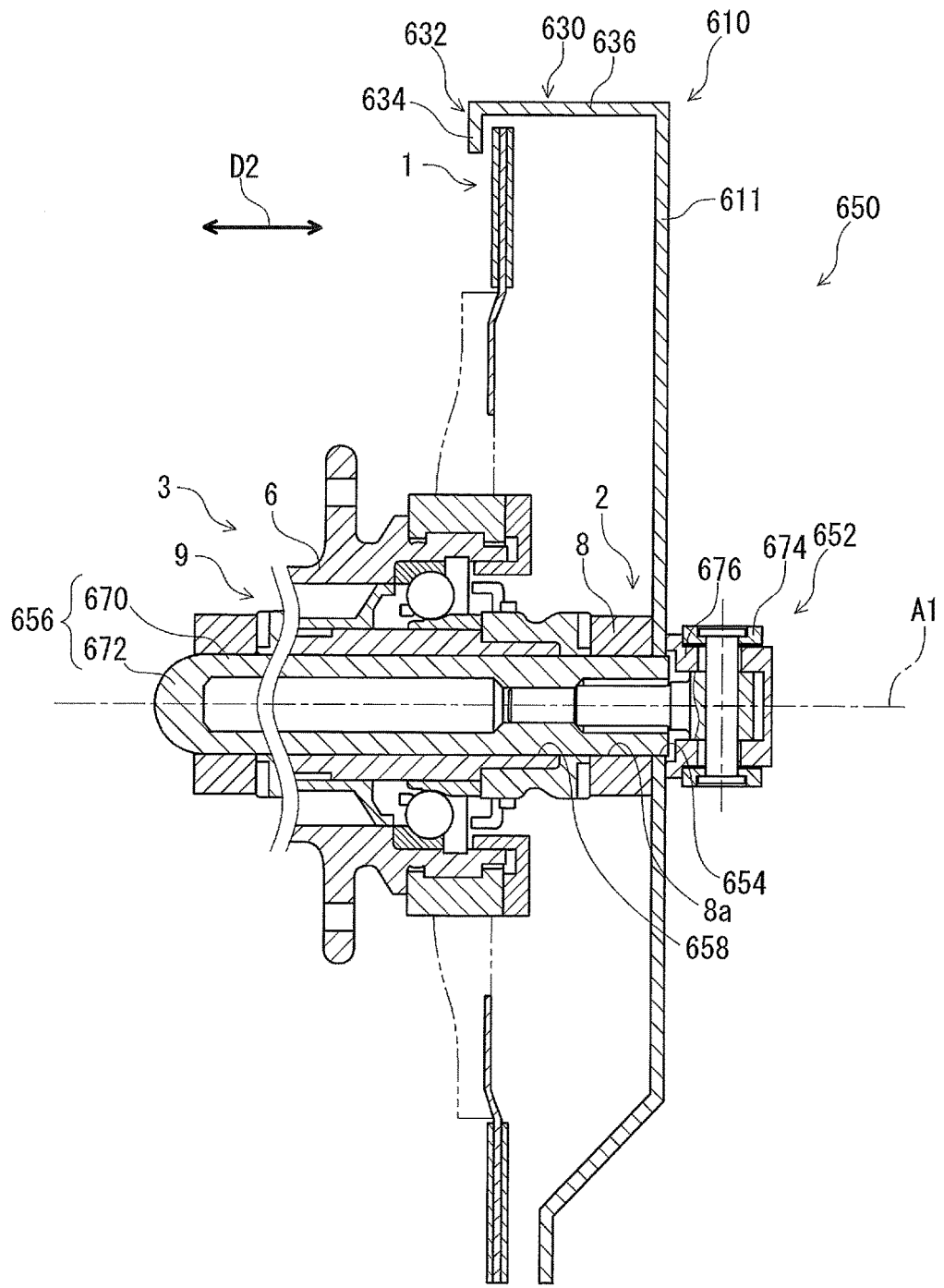
FIG. 20 is a cross-sectional view of the disc brake rotor, the bicycle hub assembly, and the rotor cover in accordance with a modification of the sixth embodiment.
Figure 21:
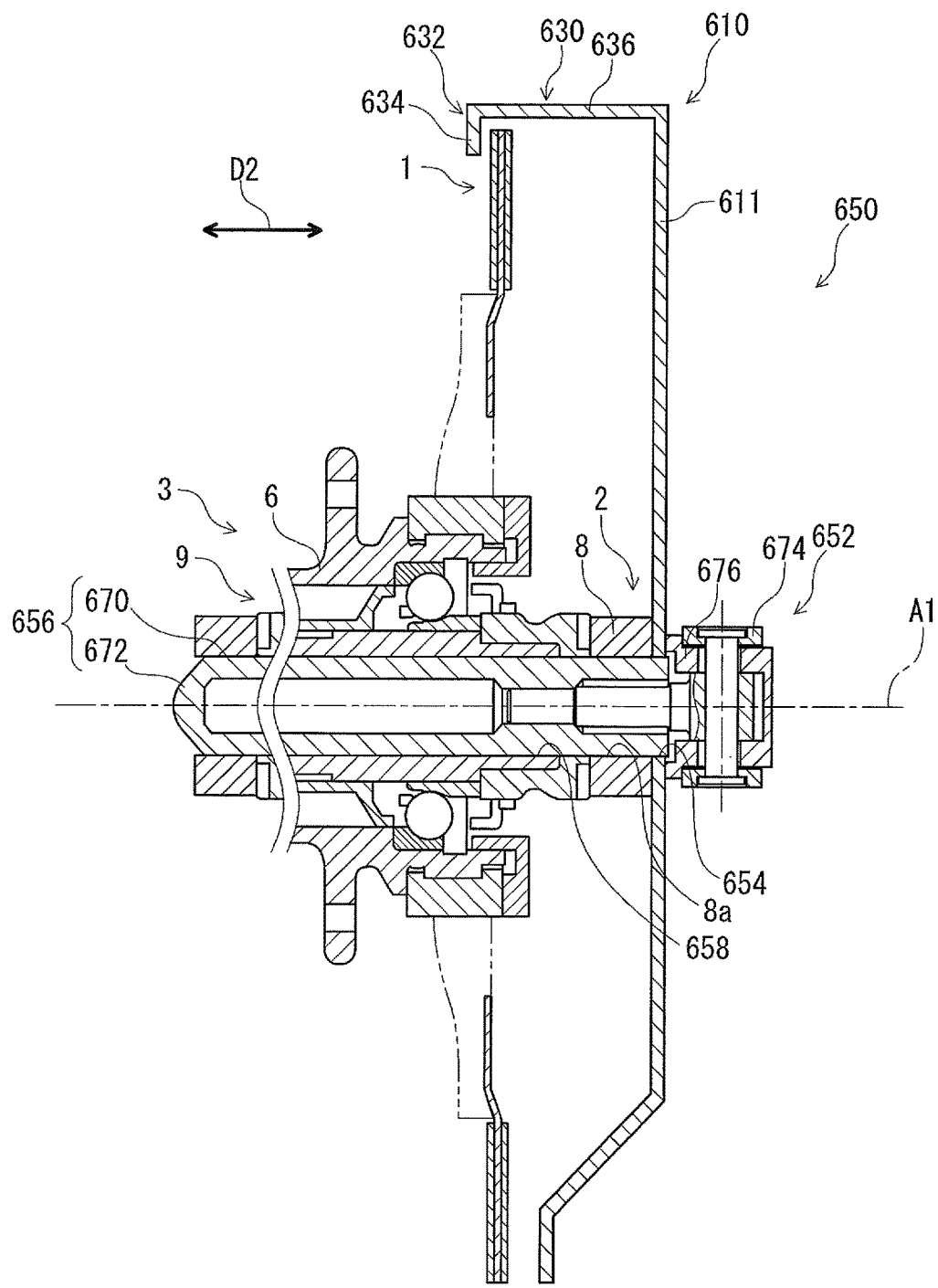
FIG. 21 is a cross-sectional view of the disc brake rotor, the bicycle hub assembly, and the rotor cover in accordance with an another modification of the sixth embodiment.

While the end portion 672 of the axle rod 656 has a tapered shape in the illustrated embodiment, the end portion 672 of the axle rod 656 can have other shapes if needed and/or desired. As seen in FIGS. 20 and 21, for example, the end portion 672 can at least partially have a round shape and a combination of the tapered shape and the round shape.

Seventh Embodiment

A rotor cover 710 in accordance with a seventh embodiment will be described below referring to FIG. 22. The rotor cover 710 has the same configuration as the rotor cover 10 except for the cover body 11. Thus, elements having substantially the same function as those in the above embodiments will be numbered the same here, and will not be described and/or illustrated again in detail here for the sake of brevity.

Figure 22:
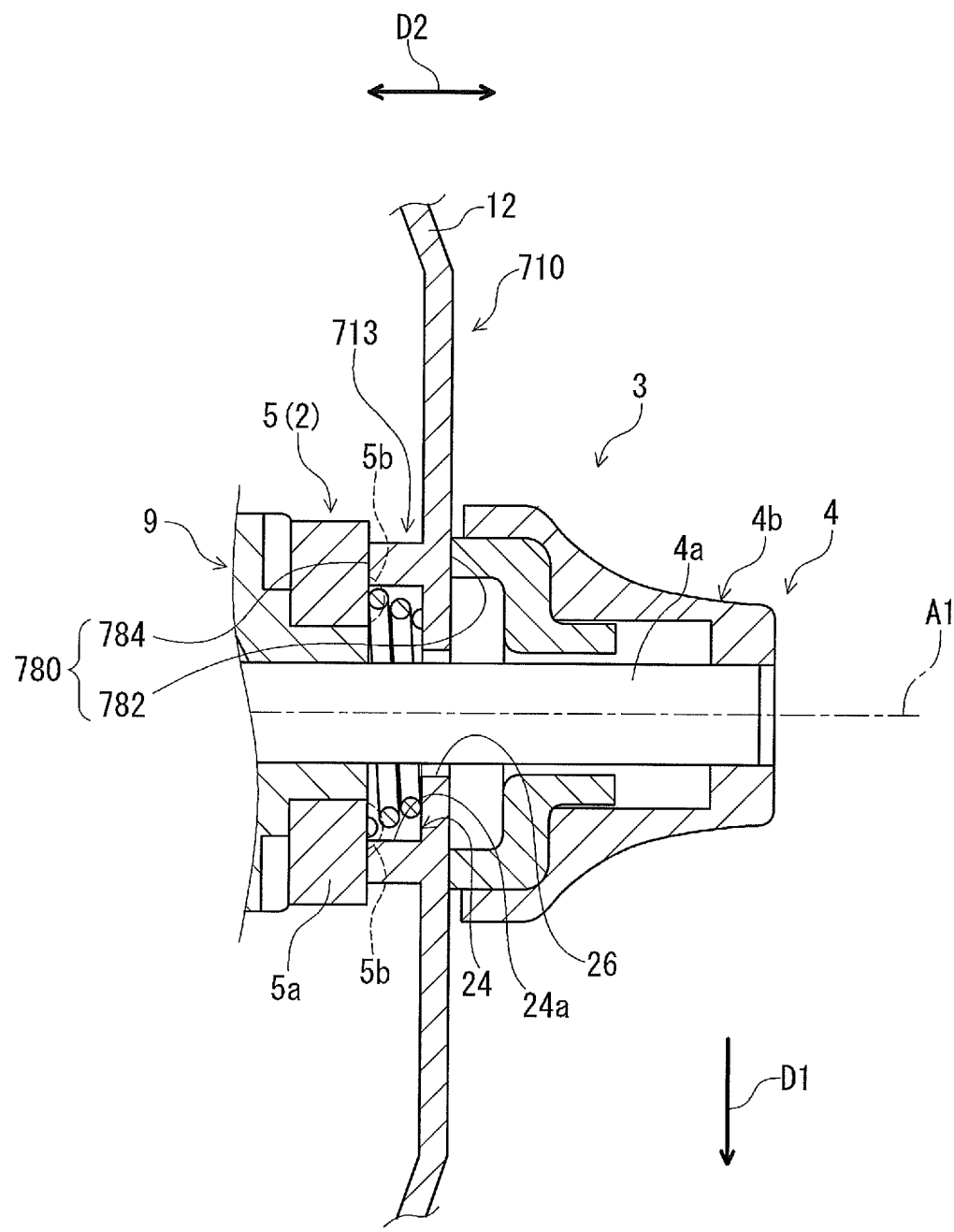
FIG. 22 is a partial enlarged cross-sectional view of a bicycle hub assembly and a rotor cover in accordance with a seventh embodiment.

As seen in FIG. 22, the rotor cover 710 comprises the cover portion 12 and a contact portion 713. The contact portion 713 is configured to be in contact with at least one of the bicycle hub assembly 3 and the bicycle frame 2. In the illustrated embodiment, the contact portion 713 corresponds to the mounting portion 14 and the spacer 222 in accordance with the second embodiment.

The contact portion 713 includes a friction increasing part 780 configured to increase a friction between the contact portion 713 and the at least one of the bicycle hub assembly 3 and the bicycle frame 2. In the illustrated embodiment, the friction increasing part 780 is configured to increase a friction between the contact portion 713 and each of the bicycle hub assembly 3 and the bicycle frame 2.

The friction increasing part 780 includes a first uneven surface 782 configured to be in contact with the bicycle hub assembly 3. A friction coefficient defined between the first uneven surface 782 and the bicycle hub assembly 3 is larger than a friction coefficient defined between the cover portion 12 and the bicycle hub assembly 3. In the illustrated embodiment, the first uneven surface 782 is configured to be in contact with the lock member 4b of the wheel securing structure 4. A friction coefficient defined between the first uneven surface 782 and the lock member 4b is larger than a friction coefficient defined between the cover portion 12 and the lock member 4b. The first uneven surface 782 has surface roughness greater than a surface of the cover portion 12. The first uneven surface 782 is formed using shot blasting, for example.

The friction increasing part 780 includes a second uneven surface 784 configured to be in contact with the bicycle frame 2. A friction coefficient defined between the second uneven surface 784 and the bicycle frame 2 is larger than a friction coefficient defined between the cover portion 12 and the bicycle frame 2. In the illustrated embodiment, the second uneven surface 784 is configured to be in contact with the fork end 5a of the front fork 5 of the bicycle frame 2. A friction coefficient defined between the second uneven surface 784 and the fork end 5a of the front fork 5 is larger than a friction coefficient defined between the cover portion 12 and the fork end 5a of the front fork 5. The second uneven surface 784 has surface roughness greater than a surface of the cover portion 12. The second uneven surface 784 is formed using shot blasting, for example.

While the friction increasing part 780 includes the first uneven surface 782 and the second uneven surface 784 in the illustrated embodiment, one of the first uneven surface 782 and the second uneven surface 784 can be omitted from the friction increasing part 780 if needed and/or desired. Furthermore, the friction increasing part 780 can include a surface coated with a material to provide a high friction coefficient between the friction increasing part 780 and the contact portion 713 and the at least one of the bicycle hub assembly 3 and the bicycle frame 2.

With the rotor cover 710, the contact portion 713 includes the friction increasing part 780 configured to increase a friction between the contact portion 713 and the at least one of the bicycle hub assembly 3 and the bicycle frame 2. The increased friction reduces a relative movement between the rotor cover 710 and at least one of the bicycle hub assembly 3 and the bicycle frame 2. Accordingly, it is possible to suppress reduction in a holding force between the bicycle hub assembly 3 and the bicycle frame 2 due to the rotor cover 710.

It will be apparent to those skilled in the bicycle field from the present disclosure that constructions of the above embodiments can be combined if needed and/or desired.

Furthermore, the constructions of the above embodiments can be applied to a front disc brake rotor and a rear disc brake rotor.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor cover comprising:
 a cover body configured to at least partially cover a disc brake rotor rotatable relative to a bicycle frame about a rotational center axis, the cover body including a mounting through-hole; and
 a biasing member configured to bias the cover body in an axial direction parallel to the rotational center axis, the biasing member being provided between the cover body and the bicycle frame in the axial direction, the biasing member having a maximum inner diameter larger than an inner diameter of the mounting through-hole of the cover body, wherein
 the biasing member comprises a coil spring configured to be compressed between the cover body and the bicycle frame in the axial direction.

2. The rotor cover according to claim 1, wherein
 the cover body and the biasing member are configured to be mounted to a bicycle hub assembly configured to rotatably support the disc brake rotor relative to the bicycle frame.

3. The rotor cover according to claim 1, further comprising:
 a spacer configured to be provided between the cover body and the bicycle frame in the axial direction, the spacer being configured to be mounted to a bicycle hub assembly, the spacer including a cavity.

4. The rotor cover according to claim 3, wherein
 the biasing member is provided in the cavity of the spacer.

5. The rotor cover according to claim 3, wherein
 the spacer is a separate member from the cover body.

6. The rotor cover according to claim 3, wherein
the cavity comprises a through-hole extending in the axial direction.

7. The rotor cover according to claim 1, wherein
the biasing member includes an opening having the maximum inner diameter.

8. A rotor cover comprising:
a cover body configured to at least partially cover a disc brake rotor rotatable relative to a bicycle frame about a rotational center axis, the cover body including a mounting through-hole; and
a biasing member configured to bias the cover body in an axial direction parallel to the rotational center axis, the biasing member being provided between the cover body and the bicycle frame in the axial direction, the biasing member having a maximum inner diameter larger than an inner diameter of the mounting through-hole of the cover body, wherein
the biasing member includes an opening having the maximum inner diameter, and
the opening has a minimum inner diameter larger than the inner diameter of the mounting through-hole of the cover body.

9. The rotor cover according to claim 8, wherein
the maximum inner diameter is larger than the minimum inner diameter.

* * * * *